US012693473B2

(12) United States Patent    (10) Patent No.: US 12,693,473 B2

Dainese, Jr. et al.    (45) Date of Patent: Jul. 28, 2026

(54) METASURFACE-BASED OPTICAL SIGNAL MANIPULATION DEVICES FOR OPTICAL FIBER COMMUNICATIONS

(71) Applicant: CORNING INCORPORATED, Corning, NY (US)

(72) Inventors: Paulo Clovis Dainese, Jr., Painted Post, NY (US); Kangmei Li, San Jose, CA (US); Ming-Jun Li, Horseheads, NY (US); Jun Yang, Mountain View, CA (US)

(73) Assignee: Corning Incorporated, Corning, NY (US)

( * ) Notice: Subject to any disclaimer, the term of this patent is extended or adjusted under 35 U.S.C. 154(b) by 446 days.

(21) Appl. No.: 18/038,465

(22) PCT Filed: Jan. 29, 2021

(86) PCT No.: PCT/US2021/015927
§ 371 (c)(1),
(2) Date: May 24, 2023

(87) PCT Pub. No.: WO2022/115121
PCT Pub. Date: Jun. 2, 2022

(65) Prior Publication Data

US 2024/0012202 A1    Jan. 11, 2024

Related U.S. Application Data

(60) Provisional application No. 63/118,324, filed on Nov. 25, 2020.

(51) Int. Cl.
*G02B 6/26*    (2006.01)
*G02B 1/00*    (2006.01)
(Continued)

(52) U.S. Cl.
CPC ............. *G02B 6/264* (2013.01); *G02B 1/002* (2013.01); *G02B 6/02042* (2013.01);
(Continued)

(58) Field of Classification Search
None
See application file for complete search history.

(56) References Cited

U.S. PATENT DOCUMENTS 10,324,286 B2   6/2019   Morizur et al.
2019/0154877 A1   5/2019   Capasso et al.
(Continued)

FOREIGN PATENT DOCUMENTS

CN   109597160 A   4/2019
CN   111090148 A   5/2020
(Continued)

OTHER PUBLICATIONS

A. Fender, et al., "Two-axis temperature-insensitive accelerometer based on multicore fiber Bragg gratings," IEEE Sens. J. Vol. 7, 2008, pp. 1292-1298.
(Continued)

*Primary Examiner* — Chris H Chu
(74) *Attorney, Agent, or Firm* — Svetlana Z. Short

(57) ABSTRACT

An apparatus comprises a fiber input, the fiber input comprising a plurality of input fiber cores receiving a plurality of input optical signals. The apparatus also comprises an optical signal manipulation device that is one of a fiber mode shuffler, a fiber coupler, a power splitter, or a 90-degree optical hybrid. The optical signal manipulation device comprises an input aperture held in spaced relation to the fiber input, an output aperture, and a plurality of metasurfaces that manipulate phase profiles of the plurality optical signals to generate a plurality of output optical signals having a different spatial arrangement than the input optical signal. A (Continued)

fiber output is held in spaced relation to the output aperture such that fiber cores of the fiber output receive the plurality of output optical signals.

8 Claims, 12 Drawing Sheets

(51) Int. Cl.

| | |
|---|---|
| *G02B 6/02* | (2006.01) |
| *H04B 10/2581* | (2013.01) |
| *H04J 14/00* | (2006.01) |

(52) U.S. Cl.
CPC ........ *H04B 10/2581* (2013.01); *H04J 14/052* (2023.08); *G02B 2207/101* (2013.01)

(56) References Cited

U.S. PATENT DOCUMENTS

| | | | | |
|---|---|---|---|---|
| 2019/0178714 | A1 | 6/2019 | Faraji-Dana et al. | |
| 2019/0386749 | A1* | 12/2019 | Lezec | H04B 10/25137 |
| 2021/0373200 | A1* | 12/2021 | Luo | G02B 5/1814 |
| 2022/0179222 | A1* | 6/2022 | Guo | G02B 5/1861 |
| 2023/0085821 | A1 | 3/2023 | Capasso et al. | |
| 2023/0088292 | A1 | 3/2023 | Capasso et al. | |
| 2023/0194757 | A1* | 6/2023 | Hansen | G02B 5/1819 |
| | | | | 359/245 |
| 2023/0208104 | A1* | 6/2023 | Tamagnone | H01S 5/141 |
| | | | | 372/20 |

FOREIGN PATENT DOCUMENTS

| | | |
|---|---|---|
| CN | 111399127 A | 7/2020 |
| JP | 2020-144165 A | 9/2020 |
| TW | 201842367 A | 12/2018 |

OTHER PUBLICATIONS

B. Zhu, et al., "112-Tb/s space-division multiplexed DWDM transmission with 14-b/s/Hz aggregate spectral efficiency over a 76.8-km seven-core, fiber", Opt. Express, vol. 19, 2011, pp. 16665-16671.

Elham et al., "Dielectric Broadband Metasurfaces for Fiber Mode-Multiplexed Communications", In Advanced Optical Materials, vol. 7, No. 14, Apr. 2019 , p. 1801679.

F.V. Laere, et al., Compact and Highly Efficient Grating Couplers Between Optical Fiber and Nanophotonics Waveguides, J. Lightwave Technol., col. 25, No. 1, 2007, pp. 151-156.

Faraji-Dana, M. et al. "Hyperspectral Imager with Folded Metasurface Optics". ACS Photonics, vol. 6, 2019, pp. 2161-2167.

G. M. H. Flockhart, et al., "Two-axis bend measurement with Bragg gratings in multicore optical fiber," Opt. Lett. vol. 28, 2003, pp. 387-389.

Gasulla I, et al., "Microwave photonics applications of multicore Fibers", IEEE Photonics Journal., 2012, vol. 4, No. 3, pp. 877-888.

Giles, M. B. et al., "Introduction to the Adjoint Approach to Design" Flow, Turbulence and Combustion vol. 65, 2000, pp. 393-415.

Hashimoto, T. et al., "Optical circuit design based on a wave front-matching method", Opt. Lett. vol. 30, No. 2620, 2005.

International Search Report and Written Opinion of the International Searching Authority; PCT/US2021/015927; dated Jul. 28, 2019; 14 pages; European Patent Office.

Kopp, Victor I., et al., "Chiral fibers: microformed optical waveguides for polarization control, sensing, coupling, amplification, and switching." Journal of Lightwave Technology, vol. 32, No. 4, 2013, pp. 605-613.

Lalau-Keraly, et al., "Adjoint shape optimization applied to electromagnetic design", Optics express, vol. 21, 2013, pp. 21693-21701.

Lee, G., et al., "Metasurface eyepiece for augmented reality", Nat Commun., vol. 9, No. 4562, 2018.

Lin, Z., et al., "Enhanced Spontaneous Emission at Third-Order Dirac Exceptional Points in Inverse-Designed Photonic Crystals", Physical review letters, vol. 117, 107402, 2016.

M. Faraji-Dana, et al., "Compact folded metasurface spectrometer", Nature communications, vol. 9, No. 4196, 2018.

Macho A, et al., "Next-generation optical fronthaul systems using multicore fiber media", Journal of Lightwave Technology., 2016, vol. 34, No. 20, pp. 4819-4827.

Michaels, A. et al., "Inverse design of near unity efficiency perfectly vertical grating couplers", Optics express, vol. 26, 2018, pp. 4766-4779.

Molesky, S. et al., "Inverse design in nanophotonics", Nature Photon, vol. 12, 2018, pp. 659-670.

Psaila, Nicholas, "3D laser direct writing for advanced photonic integration", Optical Interconnects XIX., vol. 10924. International Society for Optics and Photonics, 2019, pp. 1-9.

R.R. Thomson, et al., "Ultrafast-laser inscription of a three dimensional fan-out device for multicore fiber coupling applications", Opt. Express, vol. 15, No. 18, 2007, pp. 11691-11697.

Sawada, Y., et al., "Development of the Wavefront Matching Method Based on the 3-D Finite-Element Method and Its Application to Si-wire Mode Converters", J. Lightwave Technol., vol. 36, 2018, pp. 3652-3659.

Transmission Systems Using Multicore Fibers, Yoshinari Awaji, in Optical Fiber Telecommunications (Sixth Edition), 2013.

V. Francois, et al., "Multicore Fiber Optimization for Application to Chip-to-Chip Optical Interconnects", J. of Lightwave Tech., vol. 31, No. 24, 2013, pp. 4022-4028.

W. Klaus, et al., "Free-space coupling optics for multi-core fibers", in: IEEE Photonics Society Summer Topicals 2012.

Y. Sakamaki, et al., "New Optical Waveguide Design Based on Wavefront Matching Method," Journal of Lightwave Technology, vol. 25, No. 11, 2007, pp. 3511-3518.

Yamashita, Y. et al., "Design and Fabrication of Broadband PLC-Based Two-Mode Multi/Demultiplexer Using a Wavefront Matching Method", J. Lightwave Technol. vol. 35, 2017, pp. 2252-2258.

Yu, N., et al., "Flat optics with designer metasurfaces", Nature materials, vol. 13, 2014, pp. 139-150.

Taiwanese Patent Application No. 110103485, Office Action dated Oct. 14, 2024, 2 pages (English Translation only), Taiwanese Patent Office.

* cited by examiner

METASURFACE-BASED OPTICAL SIGNAL MANIPULATION DEVICES FOR OPTICAL FIBER COMMUNICATIONS

CROSS-REFERENCE TO RELATED APPLICATIONS

This application claims the benefit of priority under 35 U.S.C. § 371 of International Application No. PCT/US2021/015927, filed on Jan. 29, 2021, which claims the benefit of priority under 35 U.S.C. § 119 of U.S. Provisional Ser. No. 63/118,324 filed on Nov. 25, 2020, the content of which is relied upon and incorporated herein by reference in its entirety.

FIELD

The present specification generally relates to optical communication systems and more specifically to fiber optic signal manipulation devices for optical fiber communications.

TECHNICAL BACKGROUND

Optical fiber transmission systems are employed in data centers and optical networks to optically connect a plurality of different optical devices. To increase the capacity of such optical transmission systems, various spatial division multiplexing techniques have been investigated including multimode fibers, multi-core fibers, or fiber cable systems. To interface various components of such multiplexed optical fiber transmission systems, it may be necessary to route optical signals through a plurality of different optical fibers or to rearrange optical signals within a particular fiber transmission system. For example, fiber mode shufflers may alter an arrangement of optical signals traveling through multi-core fiber of a fiber transmission system. Current optical signal manipulation devices such as fiber mode shufflers are difficult to assemble, bulky, and/or suffer from coupling inefficiencies.

SUMMARY

A first aspect of the present disclosure includes an apparatus comprising a fiber input, a fiber output, and an optical signal manipulation device. The fiber input comprises a plurality of input fiber cores, the plurality of input fiber cores receiving a plurality of input optical signals The optical signal manipulation device comprises an input aperture held in spaced relation to the fiber input to receive the plurality of input optical signals in a first spatial arrangement and a plurality of metasurfaces. Each of the plurality of metasurfaces comprises a plurality of nanostructures separated from one another by less than a wavelength of the plurality of input optical signals. The optical signal manipulation devices further comprises an output aperture. The plurality of metasurfaces manipulate phase profiles of the plurality of input optical signals to generate a plurality of output optical signals. The plurality of output optical signals have a second spatial arrangement at the output aperture that differs from the first spatial arrangement. The apparatus further comprises fiber output comprising a plurality of output fiber cores, wherein the fiber output is held in spaced relation to the output aperture of the optical signal manipulation device such that the plurality of output fiber cores receive the plurality of output optical signals in the second spatial arrangement. The optical signal manipulation device comprises one of a fiber mode shuffler, a fiber coupler, a power splitter, or a 90-degree optical hybrid.

A second aspect of the present disclosure includes a device according to the first aspect, wherein the fiber input comprises a first multicore fiber and the plurality of input fiber cores are disposed in a common cladding of the first multicore fiber.

A third aspect of the present disclosure includes a device according to any of the first through the second aspects, wherein the plurality of input fiber cores are disposed in the common cladding in an arrangement that corresponds to the first spatial relationship of the plurality of input optical signals.

A fourth aspect of the present disclosure includes a device according to any of the first through the third aspects, wherein the fiber output comprises a second multicore fiber and the plurality of output fiber cores are disposed in a common cladding of the second multicore fiber in an arrangement that corresponds to the second spatial relationship of the plurality of output optical signals.

A fifth aspect of the present disclosure includes a device according to any of the first through the fourth aspects, wherein the fiber input comprises a first single core fiber array and the fiber output comprises a second single core fiber array.

A sixth aspect of the present disclosure includes a device according to any of the first through the fifth aspects, wherein the first and second single core fiber arrays comprise the same core spacing.

A seventh aspect of the present disclosure includes a device according to any of the first through the sixth aspects, wherein the plurality of metasurfaces comprises a first metasurface and a second metasurface, the first metasurface comprising a first plurality of nanostructures arranged in a pattern based on the first spatial arrangement such that the first plurality of nanostructures modify wavefront tilts of the plurality of input optical signals between the first metasurface and the second metasurface.

A eighth aspect of the present disclosure includes a device according to any of the first through the seventh aspects, wherein the second metasurface re-directs the plurality of output optical signals towards the plurality of output fiber cores in the second spatial arrangement.

A ninth aspect of the present disclosure includes a fiber mode shuffler comprising: a transmissive substrate comprising an input aperture for receiving a plurality of input optical signals from an input fiber; and a plurality of metasurfaces, at least one of the plurality of metasurfaces disposed on the transmissive substrate. Each of the plurality of metasurfaces is separated from one another along propagation paths of the plurality of input optical signals through the transmissive substrate. The plurality of input optical signals interact with each of the plurality of metasurfaces such that the plurality of metasurfaces modify phase profiles of the plurality input optical signals to generate a plurality of output optical signals. Each of the plurality of metasurfaces comprises a plurality of nanostructures with a structural arrangement determined based on an arrangement of fiber cores of the input fiber and a desired spatial arrangement of the plurality of output optical signals. The plurality of metasurfaces modify wavefront tilts of the plurality of input optical signals such that the plurality of output optical signals possess the desired spatial arrangement at the output aperture. The fiber mode shuffler comprises an output aperture for emitting the plurality of output optical signals to an output fiber comprising a plurality of fiber cores for receiving the plurality of output optical signals in the desired spatial arrangement, wherein the plurality of fiber cores of the output fiber are arranged in the same manner as a plurality of fiber cores of the input fiber.

A tenth aspect of the present disclosure includes a fiber mode shuffler according to the ninth aspect, wherein a combined phase profile of the plurality of metasurfaces comprises an asymmetrical structure.

An eleventh aspect of the present disclosure includes a fiber mode shuffler according to any of the ninth through the tenth aspects, wherein a combined phase profile of the plurality of metasurfaces comprises a plurality of features that are arranged in a manner that does not correspond to the arrangements of the fiber cores of the input fiber and the output fiber.

A twelfth aspect of the present disclosure includes a fiber mode shuffler according to any of the ninth through the tenth aspects, wherein the plurality of nanostructures of each of the plurality of metasurfaces are separated from one another by less than a wavelength of the plurality of input optical signals.

A thirteenth aspect of the present disclosure includes a fiber mode shuffler according to any of the ninth through the twelfth aspects, wherein the input fiber and the output fiber comprise multi-core fibers.

A fourteenth aspect of the present disclosure includes a fiber mode shuffler according to any of the ninth through the thirteenth aspects, wherein the input fiber and the output fiber comprise an array of single core fibers.

A fifteenth aspect of the present disclosure includes an apparatus comprising: an input fiber having an input optical signal propagating therethrough and a fiber optic coupler held in spaced relation to the input fiber. The fiber optic coupler comprises: one or more input apertures for receiving an input optical signal; one or more output apertures for emitting an output optical signal from the fiber optic coupler; and a plurality of metasurfaces disposed along a propagation path of the input optical signal between the one or more input apertures and the one or more output apertures. The input optical signal interacts with each of the plurality of metasurfaces such that the plurality of metasurfaces modify a phase profile of the input optical signal, each of the plurality of metasurfaces comprises a plurality of nanostructures with a structural arrangement determined based on a first number of optical signals in the input optical signal, a second number of optical signals in the output optical signal, and a desired power distribution between the optical signals in the output optical signal. The apparatus also includes an output fiber held in spaced relation to the output aperture to receive the output optical signal.

A sixteenth aspect of the present disclosure includes an apparatus according to the fifteenth aspect, wherein the first number of optical signals in the input optical signal equals the second number of optical signals in the output optical signal.

A seventeenth aspect of the present disclosure includes an apparatus according to any of the fifteenth through the sixteenth aspects, wherein the first number of optical signals in the input optical signal is less than the second number of optical signals in the output optical signal.

An eighteenth aspect of the present disclosure includes an apparatus according to any of the fifteenth through the seventeenth aspects, wherein the fiber optic coupler operates as a power splitter splitting the input optical signal into different optical cores of the output fiber.

A nineteenth aspect of the present disclosure includes an apparatus according to any of the fifteenth through the eighteenth aspects, wherein the first number of optical signals in the input optical signal is greater than the second number of optical signals in the output optical signal.

A twentieth aspect of the present disclosure includes an apparatus according to any of the fifteenth through the nineteenth aspects, wherein: the fiber input comprises a single core fiber and the input optical signal comprises a single optical signal; the output fiber comprises two or more single core fibers; the plurality of nanostructures of a first one of the plurality of metasurfaces is structurally arranged to modify wavefront tilts of different portions of input optical signal so as to separate the different portions; and the plurality of nanostructures of a second one of the plurality of metasurfaces is structurally arranged to direct the separated different portions towards the output aperture in an arrangement corresponding to the cores of the output fiber.

A twenty first aspect of the present disclosure includes an apparatus comprising: an input fiber having a plurality of input optical signals propagating therethrough; a 90 degree optical hybrid device held in spaced relation to the input fiber. The 90 degree optical hybrid device comprises: a plurality of input apertures for receiving the plurality of input optical signals; a plurality of output apertures for emitting a plurality of output optical signals from the optical hybrid device; and a plurality of metasurfaces disposed along a propagation path of the input optical signals between the plurality of input apertures and the plurality of output apertures. The plurality of input optical signals interact with each of the plurality of metasurfaces such that the plurality of metasurfaces modify phase profiles of the plurality of input optical signals. Each of the plurality of metasurfaces comprises a plurality of nanostructures structurally arranged to combine the plurality of input signals with varying phase differences to generate the plurality of output optical signals, such that the plurality of output optical signals each contains a different combination of the plurality of input optical signals. The apparatus also includes an output fiber held in spaced relation to the output aperture to receive the output optical signal.

A twenty second aspect of the present disclosure includes an apparatus according to the twenty first aspect, wherein: the plurality of input optical signals comprises a first signal and a reference signal; and the plurality of metasurfaces mix the first signal with four quadrature states of the reference signal to generate the plurality of output optical signals.

A twenty third aspect of the present disclosure includes an apparatus according to any of the twentieth through the twenty first aspects, wherein at least one of the input fiber and the output fiber comprises a 2×2 multi-core fiber.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings depict the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 7A1 depicts an input aperture for an example optical device having a structure corresponding to the optical device depicted in FIG. 4B, according to one or more embodiments described herein;

FIG. 7A2 depicts an input aperture for an example optical device having a structure corresponding to the optical device depicted in FIG. 4B, according to one or more embodiments described herein;

FIG. 9A1 depicts an input aperture of an example optical device configured to operate as a 90 degree optical hybrid, according to one or more embodiments described herein;

FIG. 9A2 depicts an output aperture of an example optical device configured to operate as a 90 degree optical hybrid, according to one or more embodiments described herein;

DETAILED DESCRIPTION

Figure 1A:
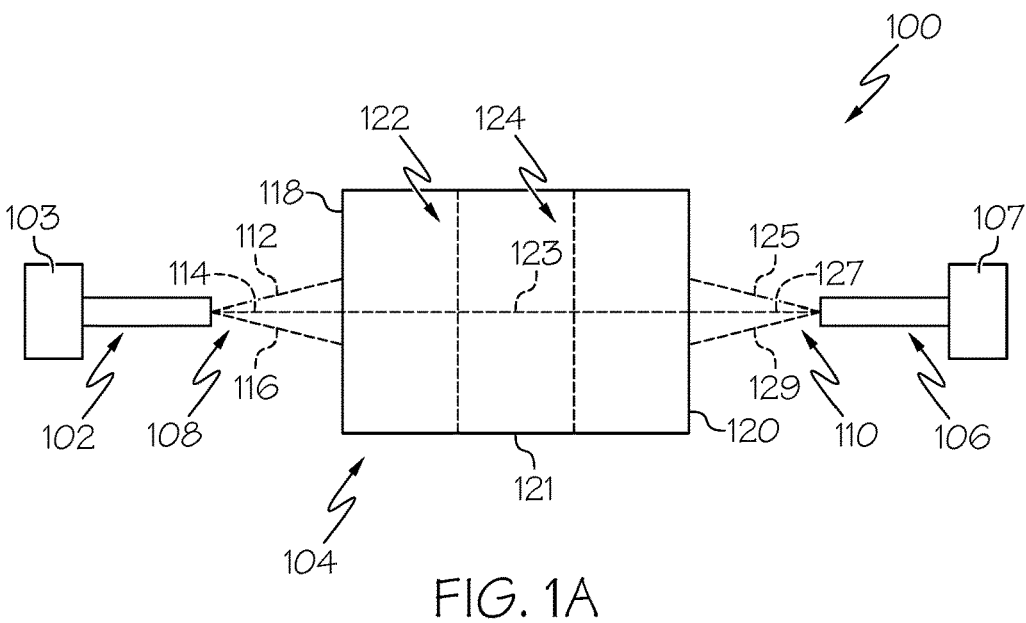
FIG. 1A schematically depicts an optical system including an optical signal manipulation device, according to one or more embodiments described herein.

Reference will now be made in detail to embodiments of optical signal manipulation devices comprising a plurality of metasurfaces that alter phase profiles of optical signals between an input fiber and an output fiber. The input fiber input may comprise a plurality of input optical fiber cores (e.g., arranged in a multi-core fiber, arranged in an array of single core fibers, etc.) and be held in spaced relation to an input aperture of an optical signal manipulation device comprising a plurality of metasurfaces. Each metasurface may comprise a plurality of nanostructures arranged in various sections to manipulate phase profiles of the optical signals. In embodiments, the plurality of metasurfaces may tilt wavefronts of the plurality of optical signals so as to vary the propagation direction of each of the optical signals in a desired manner. In embodiments, the plurality of metasurfaces may further alter the phase profile of the tilted optical signals so as to redirect the tilted optical signals towards an output aperture of the optical signal manipulation device. A plurality of output optical fiber cores of an output fiber may be positioned with respect to the output aperture so as to receive the redirected optical signals. The number and configuration of metasurfaces may be varied depending on the implementation to achieve various different modifications of the optical signals within the optical signal manipulation device. For example, in embodiments, the optical signal manipulation device comprises a fiber mode shuffler that alters a spatial arrangement of optical signals traveling through a multicore fiber or a single core fiber array. In embodiments, the optical signal manipulation device comprises a 90-degree optical hybrid. In embodiments, the optical signal manipulation device comprises a fiber optical coupler or a power splitter. In embodiments, the optical signal manipulation device comprises an optical fan-out or fan-in device, where optical cores of a multi-core fiber are optically coupled to an array of single core fibers or vice versa. The combined phase profile of the plurality of metasurfaces may be adjusted to achieve any of the functionalities described herein.

The pluralities of metasurfaces of the optical signal manipulation devices described herein beneficially are highly configurable and can be fabricated with high spatial resolution (e.g., using nanolithography techniques). Such flexibility allows for any arrangement of cores to be accommodated for with minimal modification of the fabrication technique. Moreover, the optical signal manipulation devices may be monolithically integrated onto a single substrate, rendering them more compact than existing devices. The optical signal manipulation devices described herein may be integrated into a fiber-to-fiber connector or the like, unlike existing optical signal manipulation devices.

As used herein, the term "metasurface" refers to a plurality of nanostructures disposed on a surface that are separated from one another by less than or equal to a wavelength of an optical signal interacting with the metasurface. Each structure of a particular metasurface may be separated from at least one other structure of the metasurface by less than the wavelength. Gaps greater than the wavelength separate different metasurfaces.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

As used herein, the singular forms "a," "an" and "the" include plural referents unless the context clearly dictates otherwise. Thus, for example, reference to "a" component includes aspects having two or more such components, unless the context clearly indicates otherwise.

FIG. 1A schematically depicts an optical system 100 in accordance with an example embodiment. The optical system 100 may be a portion of a fiber optic network. As depicted, the optical system 100 comprises an input fiber 102, an optical signal manipulation device 104, and an output fiber 106. The input fiber 102 is optically coupled to a first optical device 103 and receives an input optical signal 108 from the first optical device 103. As described herein, the optical signal manipulation device 104 comprises a plurality of metasurfaces 122 and 124 that manipulate a phase profile of the input optical signal 108 to generate an output optical signal 110 that is emitted from the optical signal manipulation device 104 into the output fiber 106. The output fiber 106 is optically coupled to a second optical device 107 to deliver the output optical signal 110 thereto.

The first optical device 103 and the second optical device 107 may take a variety of forms depending on the implementation and context of the optical system 100. For example, in embodiments, the optical system 100 is a component of an optical fiber network system, and the first optical device 103 comprises a first optical switch and the second optical device 107 comprises a second optical switch used for routing optical signals through the optical fiber network system. In such a case, the optical signal manipulation device 104 may be employed as a fiber mode shuffler to effectively increase the switching capacity of the first and second optical devices 103 and 107. In another example, the first optical device 103 may comprise an optical transmitter configured to transmit the input optical signal 108 to the input fiber 102 via an optical communications link (not depicted). The second optical device 107 may comprise an optical receiver (e.g., a receiver system implemented at a headend, switching center, or the like) for performing various operations on the output optical signal 110 (e.g., perform measurements on the output optical signal 110, route the output optical signal 110 to additional components, etc.).

The input optical signal 108 and the output optical signal 110 may take a variety of forms depending on the implementation. In embodiments, the input optical signal 108 is a single mode signal propagating down the input fiber 102. For example, the input optical signal 108 may comprise a signal at a single wavelength $\lambda$ in a frequency band (e.g., the O band, the C band, the L band, or shorter wavelength windows greater than or equal to 850 nm and less than or equal 940 nm). In such embodiments, the input fiber 102 may comprise a single core optical fiber. In embodiments, the input optical signal 108 comprises a plurality of optical signals. In the depicted embodiment, the input optical signal comprises a first input optical signal 112, a second optical signal 114, and a third input optical signal 116. In embodiments, the input optical signal 108 comprises greater than or equal to 2 (e.g., greater than or equal to 3, greater than or equal to 4, greater than or equal to 5, greater than or equal to 10) optical signals.

Figure 1B:
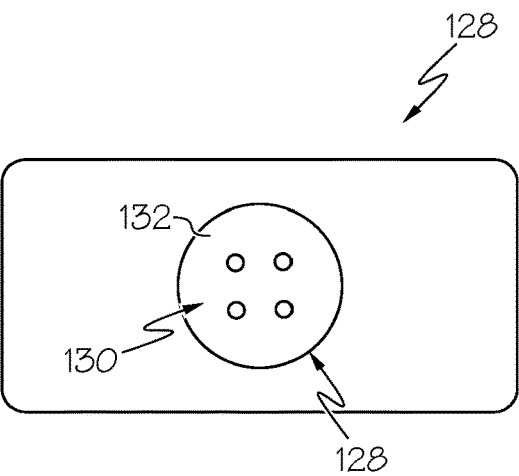
FIG. 1B schematically depicts a multi-core fiber, according to one or more embodiments described herein.
Figure 1C:
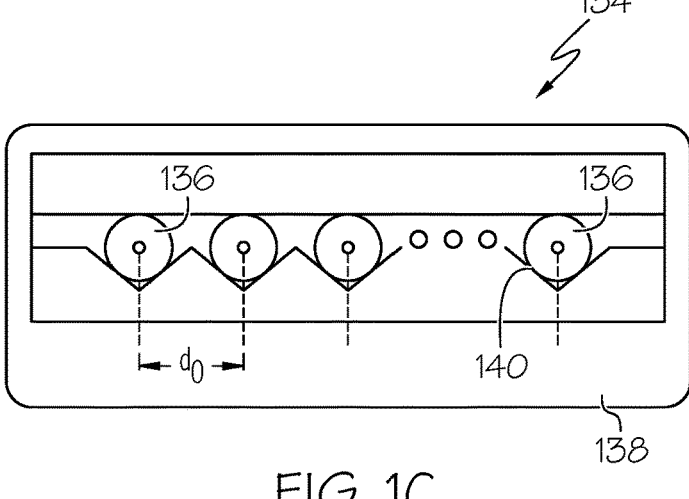
FIG. 1C schematically depicts a single core fiber array, according to one or more embodiments described herein.

In embodiments, the first, second, and third optical signals 112, 114, and 116 may propagate through the input fiber 102 in a variety of different ways depending on the configuration of the input and output fibers 102 and 106. For example, as depicted in FIG. 1B, in embodiments, the input fiber 102 comprises a multi-core fiber 128 comprising a plurality of cores 130, and each of the first, second, and third optical signals 112, 114, and 116 propagates through a separate one of the plurality of cores 130. The plurality of cores 130 are disposed in a common cladding 132 of the multi-core fiber 128. While FIG. 1B depicts the plurality of cores 130 arranged in a 2×2 square-shaped pattern, it should be appreciated that the multi-core fiber 128 may include any number and arrangement of cores. In embodiments, as depicted in FIG. 1C, the input fiber 102 comprises a single core fiber array 134 comprising a plurality of single core fibers 136 disposed in a housing 138. In the depicted example, the housing 138 comprises a plurality of v-shaped grooves 140 that guide the plurality of single core fibers 136 through the housing 138. In embodiments, the plurality of v-shaped grooves 140 are arranged such that the cores of each of the plurality of single core fibers 136 are spaced from one another by a distance do.

Referring to FIG. 1A, the output fiber 106 may also include a multi-core fiber or a single core fiber array, depending on the implementation. The input fiber 102 and the output fiber 106 may comprise any combination of fiber arrangements, depending on the implementation of the optical signal manipulation device 104 described herein. In embodiments, for example, the input fiber 102 comprises a single core fiber array (e.g., similar to the single core fiber array 134 described herein with respect to FIG. 1C) and the output fiber 106 comprises a multi-core fiber (e.g., similar to the multi-core fiber 128) described herein with respect to FIG. 1B. In embodiments, the input fiber 102 comprises a multicore fiber and the output fiber 106 comprises a single core fiber array. In embodiments, both the input fiber 102 and the output fiber 106 comprise a multi-core fiber. In embodiments, both the input fiber 102 and the output fiber 106 comprise a single core fiber array. The input fiber 102 and the output fiber 106 may comprise the same or differing number of cores, depending on the implementation. In embodiments, the input fiber 102 and the output fiber 106 comprise the same arrangement of cores (e.g., both the input fiber 102 and the output fiber 106 may comprise a multi-core fiber with the same core structure).

The optical signal manipulation device 104 comprises an input aperture 118, the plurality of metasurfaces 122 and 124, and an output aperture 120. In embodiments, the optical signal manipulation device 104 comprises a transmissive substrate 121 that is transparent to a wavelength $\lambda$ of the light of the input optical signal 108. The term "transparent," as used herein, means that the material has a linear optical absorption of less than 20% per mm of material depth, such as less than 10% per mm of material depth for a wavelength, or such as less than 1% per mm of material depth for the specified wavelength. For example, in embodiments, the first, second, and third optical signals 112, 114, and 116 of the input optical signal 108 may be single mode signals at a particular wavelength $\lambda$ (e.g., 1550 nm), and the transmissive substrate 121 is transparent at that particular wavelength $\lambda$. In embodiments, the transmissive substrate 121 is constructed of glass, polymer (e.g., SU8) or other suitable transparent material. Each of the transmissive substrates described herein may be transparent within the wavelength operating window of the optical signals propagating therethrough.

In embodiments, at least one of the plurality of metasurfaces 122 and 124 is disposed on the transmissive substrate 121. In embodiments, each of the plurality of metasurfaces 122 and 124 is disposed on one or more surfaces of the transmissive substrate 121. In embodiments, the input aperture 118 comprises a surface of the transmissive substrate 121 allowing light of the input optical signal 108 to enter the transmissive substrate 121. While the plurality of metasurfaces 122 and 124 are depicted to be separated from the input aperture 118 and the output aperture 120, it should be appreciated that one or more of the plurality of metasurfaces 122 and 124 may be disposed at or overlap with the input aperture 118 or the output aperture 120, depending on the implementation.

The plurality of metasurfaces 122 and 124 are disposed along a propagation path 123 of the input optical signal 108 through the optical signal manipulation device 104 (e.g., through the transmissive substrate 121). The plurality of metasurfaces 122 and 124 each comprises a plurality of nanostructures that are separated from one another by less than the wavelength $\lambda$ of the input optical signal 108. The plurality of nanostructures of each of the plurality of metasurfaces 122 comprise spatially varying parameters (e.g., length, width, diameter, orientation, etc.) so as to modify a phase profile of the input optical signal 108 in a desired way depending on the implementation. The plurality of metasurfaces 122 and 124 may alter the phase profile of each optical signal of the input optical signal 108 to generate the output optical signal 110. Example structures for the plurality of metasurfaces 122 and 124 are described in greater detail herein.

In embodiments, the plurality of metasurfaces 122 and 124 may alter a propagation direction of each of the first, second, and third optical signals 112, 114, and 116 to combine, split, and/or rearrange the first, second, and third optical signals 112, 114, and 116 to generate the output optical signal 110 at the output aperture 120. For example, in the depicted embodiment, the output optical signal comprises a first optical signal 125, a second optical signal 127, and a third optical signal 129. That is, the input optical signal 108 and the output optical signal 110 may comprise the same number of optical signals. In such embodiments, the optical signal manipulation device 104 be an optical fan-in or fan-out device. In such embodiments, the input fiber 102 may comprise a multi-core optical fiber having a first arrangement of cores (e.g., similar to the multi-core fiber 128 depicted in FIG. 1B), and the output fiber 106 may comprise a single core fiber array (e.g., similar to the single core fiber array 134 described herein with respect to FIG. 1C) having a second arrangement of cores. When the input optical signal 108 is emitted from the input fiber 102, the input optical signal 108 may have a first spatial arrangement at the input aperture 118 corresponding of the arrangement of cores within the input fiber 102. The plurality of metasurfaces 122 and 124 may alter phase profiles of the first, second, and third optical signals 112, 114, and 116 to tilt wavefronts thereof in differing ways such that the optical signals of the output optical signal have a second spatial arrangement at the output aperture 120 that corresponds to an arrangement of cores in the output fiber 106. In embodiments, the input optical signal 108 is routed via the plurality of metasurfaces 122 and 124 such that each optical signal of the input optical signal 108 is routed to an individual core of the output fiber 106. In embodiments, the plurality of metasurfaces 122 and 124 are designed such that light field profiles of the first, second, and third optical signals 125, 127, and 129 of the output optical signal 110 are in agreement with the fiber mode profiles of the output fiber 106, providing for low loss conversion.

In embodiments, both the input fiber 102 and the output fiber 106 comprise a similar arrangement of cores (e.g., in either a multi-core fiber or a single core fiber array), and the optical signal manipulation device 104 manipulates the phase profiles of the optical signals of the input optical signal 108 so as to alter a spatial arrangement of the optical signals. The optical signals of the input optical signal 108 may remain distinct from one another, but have a different overall spatial arrangement. For example, the first optical signal 125 of the output optical signal 110 may be emitted from the optical signal manipulation device 104 into a core of the output fiber 106 having a position that corresponds to the positioning of a core of the input fiber 102 in which the first optical signal 112 of the input optical signal 108 propagated. In such a case, the first optical signal 125 may not correspond to the first optical signal 112, but to the second optical signal 114. That is, while the overall arrangement of optical signals may be maintained, the relative ordering of the singles may be adjusted by the optical signal manipulation device 104. Such embodiments are referred to herein as a fiber mode shuffler, where the order of optical signals is altered via the plurality of metasurfaces 122 and 124.

In embodiments, the plurality of metasurfaces 122 and 124 may split or combine optical signals of the input optical signal 108 such that a number of optical signals in the output optical signal 110 differs from that of the input optical signal 108. For example, in embodiments, the optical signal manipulation device 104 may be implemented as a fiber coupler (e.g., a 1×2 optical coupler or a 1×4 optical coupler) where power from each optical signal of the input optical signal 108 is split and emitted to a plurality of different cores of the output fiber 106. In embodiments, the plurality of metasurfaces 122 and 124 may comprise pluralities of nanostructures having structural arrangements based on a desired power distribution of the optical signals of the output optical signal 110 and the arrangement of cores at the output fiber 106.

In embodiments, the optical signal manipulation device 104 may combine optical signals of the input optical signal 108 in various ways to obtain a desired output optical signal 110. For example, in embodiments, the plurality of metasurfaces 122 and 124 may be structured to combine two optical signals of the input optical signal 108 to obtain operation as a 90-degree optical hybrid. For example, phase profiles of different portions of the first optical signal 112 and the second optical signal 114 may be modified such that the different portions are combined with predetermined phase differentials. In embodiments, if the first optical signal 112 is referred to as A and the second optical signal 114 is referred to as B, the plurality of metasurfaces 122 and 124 may combine the first and second optical signals 112 and 114 with four different phase combinations to achieve the quadrature combinations A+B, A−B, A+jB, and A−jB. Such an output optical signal 110 may be used for coherent optical detection or to determine an amplitude and phase of an optical signal of the input optical signal 108.

In embodiments, the plurality of nanostructures of each of the plurality of metasurfaces 122 and 124 is particularly tailored to achieve any of the functions described herein. Various examples of potential structures and implementations for the plurality of metasurfaces 122 and 124 of the optical signal manipulation device 104 are now described in greater detail.

Figure 2A:
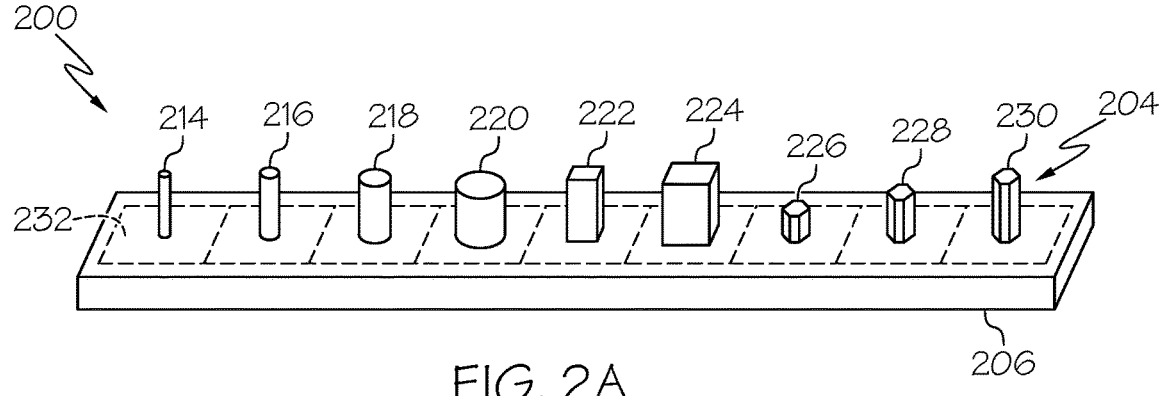
FIG. 2A schematically depicts a metasurface comprising a plurality of nanostructures, according to one or more embodiments described herein.

FIG. 2A schematically depicts a portion of a metasurface 200. In embodiments, the metasurface 200 may be implemented as one of the plurality of metasurfaces 122 and 124 of the optical signal manipulation device 104 described herein with respect to FIG. 1A. The metasurface 200 comprises a plurality of nanostructures 204 disposed on a transmissive substrate 206. In embodiments, the transmissive substrate 206 corresponds to the transmissive substrate 121 of the optical signal manipulation device 104 described herein with respect to FIG. 1A. In embodiments, the transmissive substrate 206 is constructed of a glass, polymer, or other suitable material that is transparent within the spectral range of optical signals being manipulated. In embodiments, the metasurface 200 comprises a cladding (not depicted). The cladding may be configured to mitigate loss of optical signals interacting with the plurality of nanostructures 204 or to protect plurality of nanostructures from damage, or any combination thereof. The cladding may be disposed on the transmissive substrate 206 and surround the plurality of nanostructures 204. In embodiments, the cladding may be air or some other environmental gas that surrounds the nanostructures.

The plurality of nanostructures 204 may introduce abrupt phase changes into an optical signal interacting therewith. In embodiments, the phase response at a particular location within the metasurface 200 is dependent on structural parameters (e.g., lengths, widths, diameters, geometric orientation relative to the light propagation direction) of the plurality of nanostructures 204. By varying the geometric parameters of the plurality of nanostructures 204, the phase response produced by the metasurface 200 may spatially vary depending on the particular location that a particular light ray is incident on the metasurface 200. In embodiments, depending on the arrangement of the plurality of nanostructures 204, the propagation direction, amplitude, and phase of light may be modified in various ways. In the depicted embodiment, each one of the plurality of nanostructures 204 is disposed in a unit cell 232 (e.g., pixel). In embodiments, each one of the plurality of nanostructures is centrally disposed within a unit cell 232. In embodiments, the unit cells 232 are square-shaped such that centers of each one of the plurality of nanostructures 204 are separated from one another by a length of the unit cell 232. In embodiments, the length of the unit cell 232 may be less than or equal to a wavelength of the light being manipulated by the metasurface 200. In embodiments, the unit cell 232 may have a length of approximately 500 nm. In embodiments, the geometry of the unit cell 232 may depend on the operating wavelength window.

In embodiments, the nanostructures 204 are formed of a material that is dependent on the operating wavelength window. For example, in embodiments where a manipulated optical signal is in the O band (1260-1360 nm), C band (1530-1565 nm), L band (1565-1625 nm), the plurality of nanostructures 204 may be constructed of crystalline silicon, amorphous silicon, silicon nitride, and chalcogenide glasses. In embodiments where a manipulated optical signal is in a shorter wavelength window (e.g., 850-940 nm), other suitable materials like titanium oxide and silicon nitride may be used for the plurality of nanostructures 204. In embodiments, different ones of the plurality of nanostructures 204 may be constructed of different materials.

How each one of the plurality of nanostructures 204 affects light interacting therewith may depend on one or more properties of each of the plurality of nanostructures 204. Examples of the properties of the plurality of nanostructures 204 that may affect light may include a height of the nanostructure (e.g., a dimension of the nanostructure that extends away from the substrate 206), a cross-sectional profile of the nanostructure (e.g., a cross-sectional shape of the metamaterial), a cross-sectional area of the nanostructure, a volume of the nanostructure, a diameter of the nanostructure, a dielectric property of the nanostructure, a relative difference between the dielectric property of the nanostructure and a dielectric property of the transmissive substrate 206, a relative difference between the dielectric property of the nanostructure and a dielectric property of the cladding, or any combination thereof. In embodiments, the plurality of nanostructures 204 may be a portion of a multi-level metasurface, where a first plurality of nanostructures with a first set of parameters is stacked on top of a second plurality of nanostructures comprising a second set of parameters. A multi-level metasurface may include any quantity of nanostructures. In embodiments, different nanostructures in a stack may have different dielectric properties or other properties.

Referring still to FIG. 2A, the plurality of nanostructures 204 may be a variety of different sizes and shapes to alter a phase profile of an optical signal in a desired member. For example, in the depicted embodiment, the plurality of nanostructures 204 comprises a first plurality of nanostructures 208, a second plurality of nanostructures 210, and a third plurality of nanostructures 212. The first plurality of nanostructures 208 comprises a first nanostructure 214, a second nanostructure 216, a third nanostructure 218, and a fourth nanostructure 220. The first, second, third, and fourth nanostructures 214, 216, 218, and 220 are each substantially cylindrical-shaped, but have varying diameters to induce a spatially varying phase change in incoming optical signals. The second plurality of nanostructures 210 comprises a first nanostructure 222 and a second nanostructure 224. The first and second nanostructures 222 and 224 are each substantially square-shaped pillars, but have varying side lengths to induce a spatially varying phase change in incoming optical signals. The third plurality of nanostructures 212 comprises a first nanostructure 226, a second nanostructure 228, and a third nanostructure 230. The first, second, and third nanostructures 226, 228, and 230 are each substantially hexagonal-shaped pillars, but have varying axial lengths (e.g., heights) to induce a spatially varying phase change in an incoming optical signal. As exemplified by the depicted plurality of nanostructures 204, a variety of different geometries may be used in the metasurfaces described herein. In embodiments, nanostructures comprising any cross-sectional profile, such as a circle, triangle, square, rectangle, pentagon, hexagon, v-shaped, other shaped cross-sectional profile, or any combination thereof may be used.

Figure 2B:
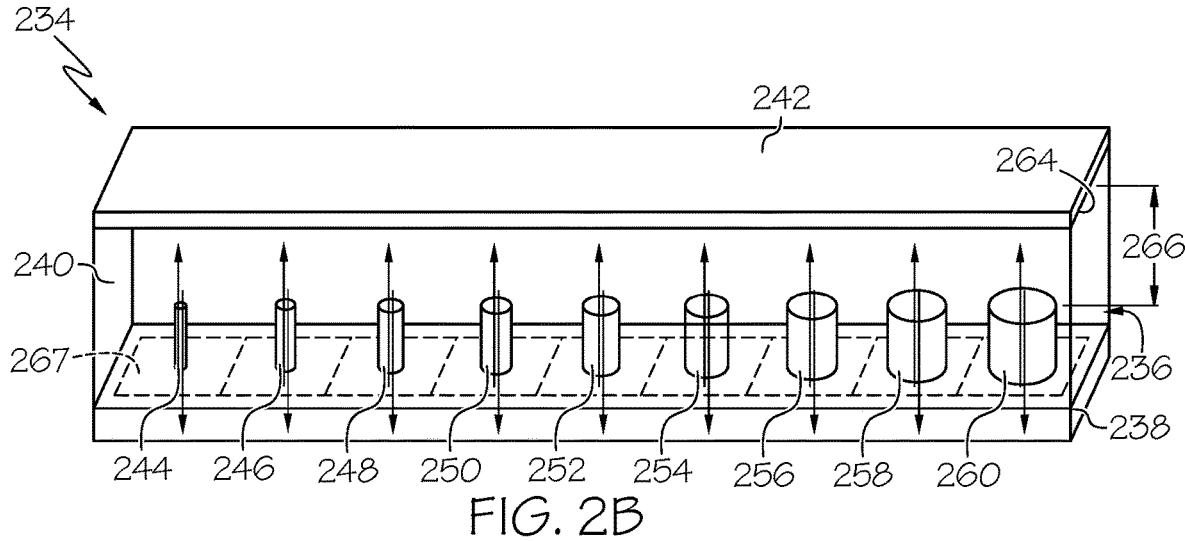
FIG. 2B schematically depicts an optical device comprising a metasurface and a reflector, according to one or more embodiments described herein.

FIG. 2B schematically depicts an optical device 234 incorporating a metasurface 236. In embodiments, the optical device 234 may correspond to a portion of the optical signal manipulation device 104 described herein with respect to FIG. 1A. The metasurface 236 comprises a plurality of nanostructures 244, 246, 248, 250, 252, 254, 256, 258, and 260 disposed on a transmissive substrate 238. The plurality of nanostructures 244, 246, 248, 250, 252, 254, 256, 258, and 260 are embedded in a cladding 240 disposed on the transmissive substrate 238. In embodiments, the cladding 240 is constructed of a polymer-based material (e.g., SU8), a glass, or other suitable material. The cladding 240 may be configured to mitigate loss of optical signals interacting with the plurality of nanostructures 244, 246, 248, 250, 252, 254, 256, 258, and 260 and/or to protect plurality of nanostructures 244, 246, 248, 250, 252, 254, 256, 258, and 260. In embodiments, the cladding 240 is constructed of a material having a lower refractive index than the plurality of nanostructures 244, 246, 248, 250, 252, 254, 256, 258, and 260.

In the embodiment depicted in FIG. 2B, the metasurface 236 is a reflective metasurface operating in a reflection mode, where light interacts with the plurality of nanostructures 244, 246, 248, 250, 252, 254, 256, 258, and 260 multiple times. To facilitate reflective operation, the optical device 234 comprises a reflector 242 disposed on the cladding 240. Light may enter the optical device 234 through the transmissive substrate 238, interact with the plurality of nanostructures 244, 246, 248, 250, 252, 254, 256, 258, and 260 a first time, reflect off the reflector 242, and then interact with the plurality of nanostructures 244, 246, 248, 250, 252, 254, 256, 258, and 260 a second time. Such multiple interactions between the light and the metasurface 236 may affect the geometric design of the plurality of nanostructures 244, 246, 248, 250, 252, 254, 256, 258, and 260. In embodiments, the reflector 242 is constructed of any suitable material that is reflective at the operating wavelength window. In embodiments, the reflector 242 is constructed of a metal such as gold.

In embodiments, a portion of the cladding 240 may be positioned between an end surface 262 of metasurface 236 (e.g., at the end of the nanostructures) and the reflector 241. In such embodiments, a distance 266 may be formed between the end surface 262 and the reflector 242. The distance 266 is sufficient to mitigate loss of optical signals passing through the metasurface 236 and being reflected by the reflector 242. In embodiments, the distance 266 may be about 500 nanometers. In embodiments, the distance 266 may be greater than or equal to 0 μm and less than or equal to 3 μm (e.g., less than or equal to 2 μm, less than or equal to 1 μm).

It should be appreciated that while FIG. 2B depicts light fields that are perpendicular to the plurality of nanostructures 244, 246, 248, 250, 252, 254, 256, 258, and 260, the transmissive substrate 238, the cladding 240, and/or the reflector 242, it should be appreciated that this need to be the case. For example, in embodiments, light fields may arrive and/or leave at an angle that is not perpendicular to any of the aforementioned structures and that such an angle may affect the spatial arrangement and geometric configuration of the plurality of nanostructures 244, 246, 248, 250, 252, 254, 256, 258, and 260 required to generate a desired output signal.

Figure 2C:
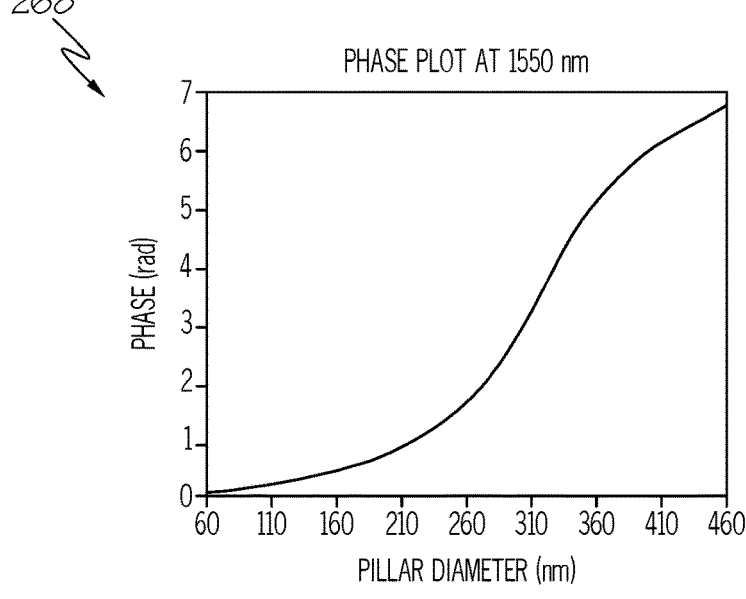
FIG. 2C schematically depicts a plot of a phase shift as a function of geometry of nanostructures of the metasurface depicted in FIG. 2B, according to one or more embodiments described herein.

As depicted in FIG. 2B, the plurality of nanostructures 244, 246, 248, 250, 252, 254, 256, 258, and 260 have a spatially varying geometric profile. Each of the plurality of nanostructures 244, 246, 248, 250, 252, 254, 256, 258, and 260 comprises a substantially cylindrical-shaped pillar having the same height (e.g., extending in a direction perpendicular to the transmissive substrate 238). In embodiments, the plurality of nanostructures 244, 246, 248, 250, 252, 254, 256, 258, and 260 increase in diameter from left the right to alter a phase profile of an optical signal in a tilted manner. For example, FIG. 2C depicts a plot of an induced phase change by a unit cell 267 of the optical device 234 described herein with respect to FIG. 2B as a function of pillar diameter contained in that unit cell 267 at a particular wavelength. As depicted, by altering the pillar diameter between 60 nm and 460 nm, a phase alteration of incoming optical signal may be adjusted from anywhere between 0 to $2\pi$. Thus, by tuning the arrangement of pillar diameters within the plurality of nanostructures 244, 246, 248, 250, 252, 254, 256, 258, and 260, different phase shift distributions may be achieved.

The example arrangement of the optical device 234 depicted in FIG. 2B, with a continuously increasing pillar diameter from left to right, for example, may be used to tilt a wavefront of an incoming signal and alter a propagation direction of that incoming signal. A plurality of such optical devices 234 may be combined to modify the propagation directions of a plurality of different optical signals in various ways in order to achieve any of the functionalities described herein. Each of the plurality of metasurfaces of the optical signal manipulation devices described herein may act as a phase plate with a particular phase profile. The phase profiles for the plurality of metasurfaces used to achieve any of the functionalities described herein (e.g., fiber mode shuffler, fiber fan-out device, fiber coupler, power splitter, optical hybrid) can be designed by various methods including a wavefront matching method, adjoint analysis method (e.g., adjoint optimization method), or any combination thereof.

In a wavefront matching method, the input fields propagating forward may be compared with the target fields propagating backward to obtain the field difference at each metasurface. The difference may be compensated for by the design of the phase plate, resulting in an accurate match of the fields. Such steps may be performed iteratively to arrive at a design. A plurality of metasurfaces may be designed with a phase profile that can yield low loss and low crosstalk performance of the device based on performing analysis using the wavefront matching method.

In an adjoint analysis (e.g., adjoint optimization), a figure of merit (FOM) of the design may be defined as the power throughput for each individual input and output pair. Given the FOM, the derivative of the FOM with respect to each design parameter can be calculated. In embodiments, the derivative of the FOM may be calculated from the propagated fields at each metasurface. Given the derivatives, an efficient gradient based non-linear enhancement routine (e.g., a Conjugate Gradient (CG), Newton-CG, Sequential Least SQuares Programming (SLSQP), a Broyden-Fletcher-Goldfarb-Shanno (BFGS) algorithm, etc.) may be used to search for the enhanced phase profile. Depending on the application, additional FOMs can be added efficiently (e.g., when it can be written as an analytic expression of the design variables or the field variables). For example, to reduce the complexity of the phase mask, a FOM term that corresponds to the mean difference of phase values between every pair of adjacent pixels (or cells) may be added to the analysis. In other examples, instead of enhancing for the average loss for all the channels, the worst case (maximal) loss among all channels can be minimized or the loss according to a specific distribution, for example the channel bandwidths, can be enhanced.

Various structures in which a plurality of metasurfaces such as the metasurfaces 200 and 236 described herein with respect to FIGS. 2A and 2B may be combined into an optical signal manipulation device are now described.

Figure 3:
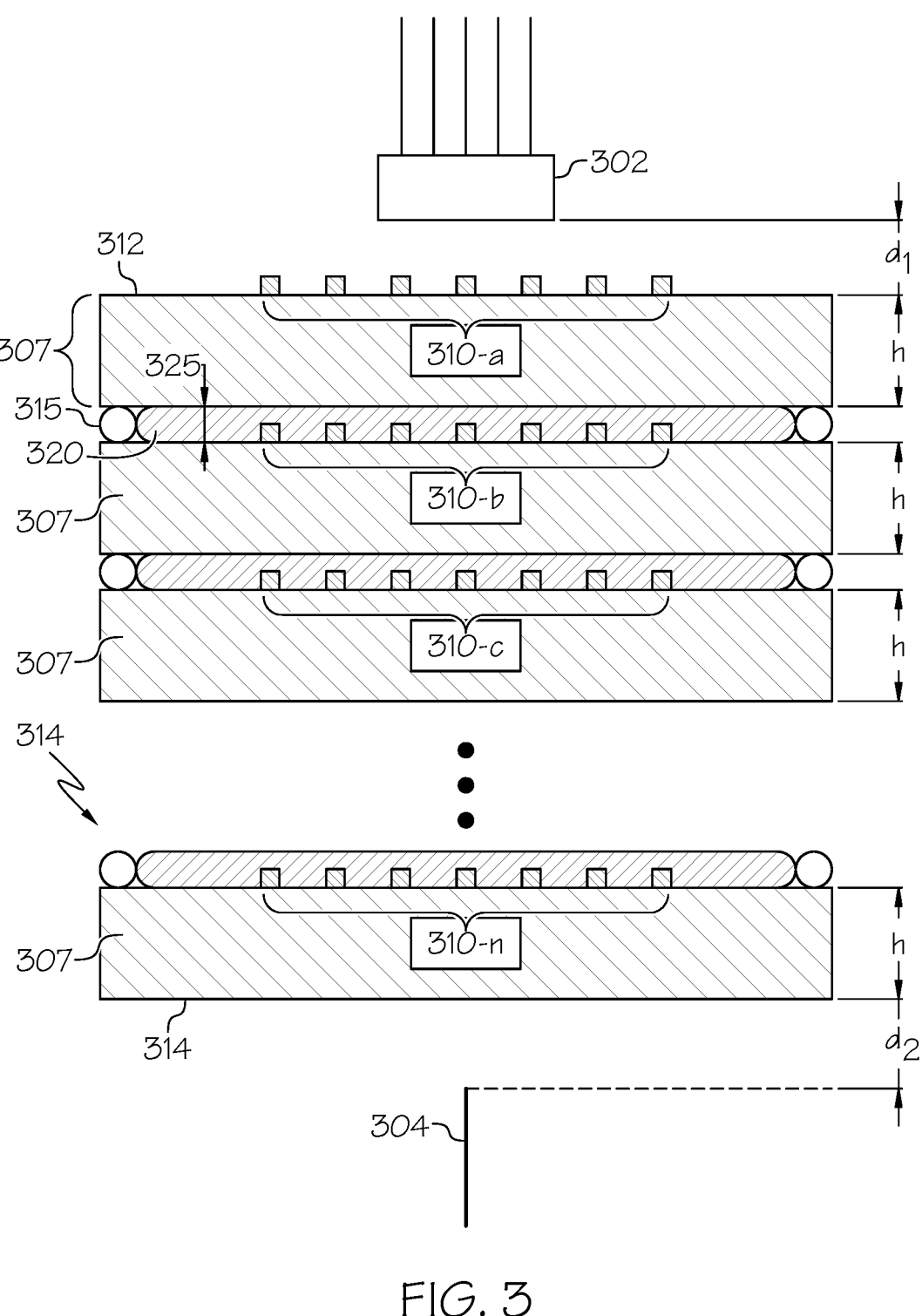
FIG. 3 schematically depicts an optical device comprising a plurality of transmissive metasurfaces, according to one or more embodiments described herein.

FIG. 3 schematically depicts an example of an optical device 300 in cross section. In embodiments, the optical device 300 may be used in place of the optical signal manipulation device 104 described herein with respect to FIG. 1A. The optical device 300 comprises a plurality of transmissive metasurfaces 310. In the depicted embodiments, the plurality of transmissive metasurfaces 310 comprises n metasurfaces. In embodiments, n is greater than or equal to 2 (e.g., greater than or equal to 3, greater than or equal to 5, greater than or equal to 10, greater than or equal to 50, greater than or equal to 100). Each of the transmissive metasurfaces 310 comprises a plurality of nanostructures (e.g., similar to the plurality of nanostructures 204 described with respect to the metasurface 200 depicted in FIG. 2A). Each of the plurality of transmissive metasurfaces 310 is disposed on a surface of a transmissive substrate 307. The transmissive substrates 307 are stacked on top of one another such that an input optical signal from an input fiber 302 (depicted as a single core fiber array) is incident on each of the plurality of transmissive metasurfaces 310 prior to being emitted into an output fiber 304 (depicted as a multi-core fiber). While each transmissive substrate 307 upon which one of the plurality of transmissive metasurfaces 310 is disposed is depicted to be identical, it should be understood that this need not be the case (e.g., different ones of the plurality of transmissive substrate 307 may have varying thickness and/or be constructed of different material).

The optical device 300 further comprises one or more spacers 315 and one or more optically clear adhesives (OCAs) 320 positioned between one of the plurality of transmissive substrates 307 and one of the transmissive metasurfaces 310 disposed on another one of the plurality of transmissive substrates 307. The optical device 300 may include any quantity of metasurfaces to perform any of the functionalities described herein. In embodiments, the quantity of transmissive substrates 307 may be the same as the number of metasurfaces in the plurality of transmissive metasurfaces 310. The quantity of layers may be determined based on a desired phase profile of the optical device 300.

In embodiments, each of the plurality of transmissive substrates 307 is configured to support one of the plurality of transmissive metasurfaces 310. The transmissive substrates 307 may have one or more parameters that define the structure, such as a height (h). In embodiments, the plurality of transmissive metasurfaces 310 may include one or more optically transmissive nanostructures that are configured to shift a phase profile of an optical signal (e.g., light) that passes therethrough. Each one of the plurality of transmissive metasurfaces 310 may be positioned in proximity to or in contact with at least one transmissive substrate 307. The structures of the plurality of transmissive metasurfaces 310 may have one or more parameters that define the nanostructures, such as a cross-sectional profile, a cross-sectional area, or a height, among other examples. In embodiments, each one of the transmissive metasurfaces 310 may be designed with a different phase profile and generate a combined phase profile. In embodiments, one or more plurality of transmissive metasurfaces 310 may have a different parameter than other plurality of transmissive metasurfaces 310 in the optical device 300 based on a desired combined phase profile of the optical device 300.

In embodiments, the spacer 315 may be positioned between two different transmissive substrates 307 and may be configured to create a space 325 between different transmissive substrates 307. The spacer 315 may be positioned in proximity to or in contact with a first transmissive substrate 307 and a second transmissive substrate 307 to create the space 325. One of the plurality of transmissive metasurfaces 310 may be positioned in the space 325 created by the spacer 315. The spacer 315 may have one or more parameters that define the structure, such as a height. In embodiments, each spacer 315 in the optical device 300 may have the same parameters. In embodiments, one or more spacers 315 may have a different parameter than other spacers 315 in the optical device 300 (e.g., the height of one or more spacers 315 may be different). Any quantity of spacers 315 may be positioned between different substrates.

The OCA 320 may be positioned in the space 325 created by the spacer 315. The OCA 320 may be an example of a liquid OCA, or a gel OCA, or any combination thereof. The OCA 320 may be an optically transmissive material. The OCA 320 may be configured to protect the plurality of transmissive metasurfaces 310. The OCA 320 may be positioned such that a metasurface is positioned in proximity to or in contact with a surface of the transmissive substrate 307 and positioned in proximity to or in contact with OCA 320. In embodiments, the OCA 320 may be positioned between one or more metasurfaces and a transmissive substrate 307. In embodiments, the OCA 320 may be an example of an index-matching substance, where a refractive index of the OCA 320 may be similar to that of one or more surrounding materials.

As depicted in FIG. 3, the input fiber 302 is held in spaced relation to a first one of the plurality of transmissive metasurfaces 310-a. In embodiments, the first one of the plurality of transmissive metasurfaces 310-a defines an input aperture 312 of the optical device 300. The input aperture 312 may be a first distance d1 from an end of the input fiber 302. The output fiber 304 is held in space relation to an output aperture 314 of the optical device 300. The output aperture 314 may be formed by a surface of one of the plurality of transmissive substrates 307. In embodiments, the output aperture 314 is formed on a surface of one of the plurality of transmissive substrates 307 that does not include one of the transmissive metasurfaces 310.

In embodiments, the combined phase profile of the plurality of transmissive metasurfaces 310 (e.g., the structural arrangements of the pluralities of nanostructures therein) is designed based on at least one of the first distance d1, the second distance d2, a spatial arrangement of cores in the input fiber 302, a spatial arrangement of cores in the output fiber 304, a number and arrangement of optical signals in an input optical signal, a desired number and arrangement of optical signals in an output optical signal emitted to the output fiber 304, and a desired composition of those output signals. For example, as depicted, the input fiber 302 comprises a single core fiber array and the output fiber 304 comprises a multi-core fiber. In such a case, the optical device 300 may be implemented as a fiber fan-in device, where the plurality of transmissive metasurfaces 310 optically couple cores of the input fiber 302 to cores of the output fiber 304. For example, the first one of the plurality of transmissive metasurfaces 310-a may collimate each optical signal emitted from the input fiber, and additional ones of the plurality of transmissive metasurfaces 310-a, 310-b, and 310-n may re-direct and focus the optical signals such that the optical signals are arranged at the output aperture 314 in a manner that corresponds to the cores of the output fiber 304. The combined phase profile of the plurality of transmissive metasurfaces 310 may be modified to obtain any of the functionalities of the optical signal manipulation device 104 described herein.

FIGS. 4A-4E schematically depict examples of optical devices that may be used as the optical signal manipulation device 104 described herein with respect to FIG. 1A. The optical devices depicted in FIGS. 4A-4E may be examples of folded designs for optical devices that use reflective surfaces to communicate light between different metasurfaces. The present specification is not limited to the express optical device configurations depicted. Any feature of any optical device configuration depicted in FIGS. 4A-4E may be combined with any other feature of any optical device configuration depicted in FIGS. 4A-4E. Aspects of the optical devices are initially described with reference to FIG. 4A, but are omitted from the descriptions of optical devices in FIGS. 4B-4E. Similarly numbered or similarly embodied features in the optical devices in FIGS. 4A-4E may be treated similarly. FIGS. 4A-4E depict optical devices having four metasurfaces. The optical devices of FIGS. 4A-4E, however, can be configured using any number of metasurfaces (e.g., one, two, three, four, five, six, seven, eight, nine, or ten metasurfaces, or greater number). The diagrams depicted in FIGS. 4A-4E may be a cross-sectional views of the optical devices.

Figure 4A:
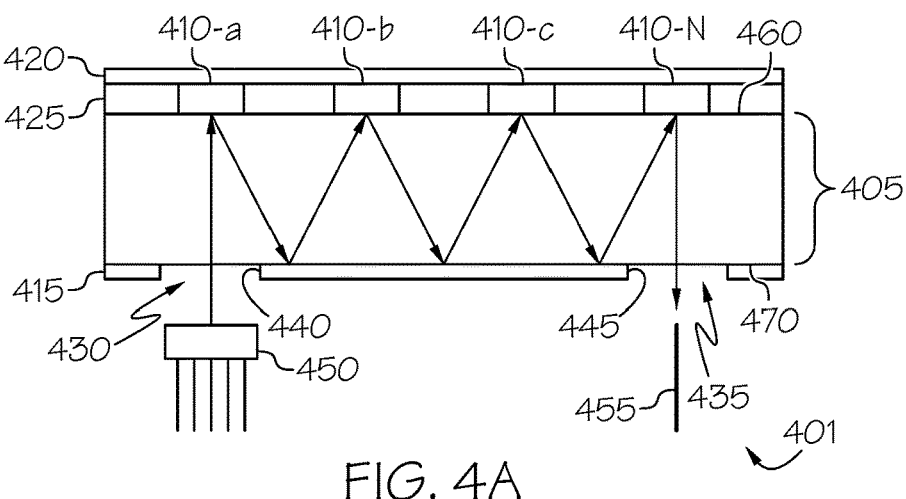
FIG. 4A schematically depicts an optical device manipulating an optical signal between an input fiber and an output fiber, the optical device comprising a plurality of reflective metasurfaces, according to one or more embodiments described herein.

FIG. 4A schematically depicts an optical device 401 comprising a transmissive substrate 405 positioned in proximity to or in contact with a plurality of metasurfaces 410, a first reflector 415, and a second reflector 420. Each one of the plurality of metasurfaces 410 may include a plurality of nanostructures (e.g., similar to those of the metasurfaces 200 and 236 described herein with respect to FIGS. 2A and 2B). In the depicted embodiment, the plurality of metasurfaces 410 are disposed on a surface 460 of a transmissive substrate 405. The transmissive substrate 405, the plurality of metasurfaces 410, the first reflector 415, and the second reflector 420 depict a folded design where light bounces between the two reflectors 415 and 420 and interacts with the metasurfaces 410 based on the light following the reflected paths. The optical device 401 may include any quantity of metasurfaces 410 to perform any of the functionalities described herein. For example, the optical device may include a first metasurface 410-a, a second metasurface 410-b, a third metasurface 410-c, or any quantity of metasurfaces 410-n. The transmissive substrate 405 may have one or more parameters that define the structure, such as a height or a cross-sectional area.

In embodiments, the plurality of metasurfaces 410 may include a plurality of nanostructures that are configured to shift a phase profile of an optical signal (e.g., light) that passes through the nanostructures. Each one of the metasurfaces 410 may be positioned in proximity to or in contact with the transmissive substrate 405. The nanostructures of the metasurfaces 410 may have one or more parameters that define the nanostructures, such as a cross-sectional profile, a cross-sectional area, or a height. In embodiments, each one of the plurality of metasurfaces 410 may be designed with a different phase profile to provide a combined phase profile suited to the particular function of the optical device 401. In embodiments, one or more of the plurality of metasurfaces 410 may have different parameters than other ones of the plurality of metasurfaces 410 in the optical device 401 based on a desired combined phase profile of the optical device 401. In embodiments, each one of the plurality of metasurfaces 410 in the optical device 401 may have the same parameters.

As depicted in FIG. 4A, the first reflector 415 may be disposed on a surface 470 of the transmissive substrate 405. The first reflector 415 may be configured to reflect an optical signal in the optical device 401 along an optical path and on to a subsequent each one of the plurality of metasurfaces 410, to the second reflector 420, or any combination thereof. In embodiments, the first reflector 415 may be formed of a suitable reflective material at the operating wavelength window of the optical device 401, such as gold. In embodiments, the first reflector 415 may comprise a structural layer that is coated with such a reflective material. The second reflector 420 may be positioned near or adjacent to the plurality of metasurfaces 410. The second reflector 420 may be configured to reflect an optical signal in the optical device 401 along an optical path and on to a subsequent each one of the plurality of metasurfaces 410, to the first reflector 415, or any combination thereof. The second reflector 420 may be formed of similar materials as the first reflector 415.

In embodiments, the optical device 401 may include a cladding 425 disposed on the surface 460 between the transmissive substrate 405 and the second reflector 420. In embodiments, the cladding 425 protects the nanostructures of the plurality of metasurfaces 410 from damage and mitigate losses of optical signals interacting with the metasurfaces 410, or any combination thereof. In embodiments, a distance (e.g., similar to the distance 266 described with reference to FIG. 2B) may be formed between the plurality of nanostructures and a surface of the second reflector 420.

The first reflector 415, the second reflector 420, and the metasurfaces 410 may be configured to direct the optical signal along the desired optical path in the optical device 401. In embodiments, one or more locations of the first reflector 415 and the second reflector 420 may be configured to redirect light in a different direction. For example, an optical signal may be incident on one of the first and second reflectors 415 and 420 at an approximately orthogonal angle to the plane of the reflector and the reflector may be configured to direct the optical signal in a different direction. In embodiments, each one of the plurality of metasurfaces 410 may be configured to alter a direction of the optical signal. In embodiments, the first reflector 415, the second reflector 420, or at least one of the plurality of metasurfaces 410, or any combination thereof, may be configured to change a direction of travel of the optical signal.

Referring still to FIG. 4A, the optical device 401 may include an input aperture 430 for receiving an input optical signal into the optical device 401 or an output aperture 435 for outputting an output optical signal from the optical device 401 or both. In the depicted embodiment, the optical device 401, the input aperture 430 and the output aperture 435 are formed by the first reflector 415. One or more sidewalls 440 of the first reflector 415 may form the input aperture 430. Likewise, one or more sidewalls 445 of the first reflector 415 may form the output aperture 435. In embodiments, the first reflector 415 may form one aperture (e.g., either the input aperture 430 or the output aperture 435) and the second reflector 420 may form the other aperture (e.g., either the input aperture 430 or the output aperture 435).

Figure 4B:
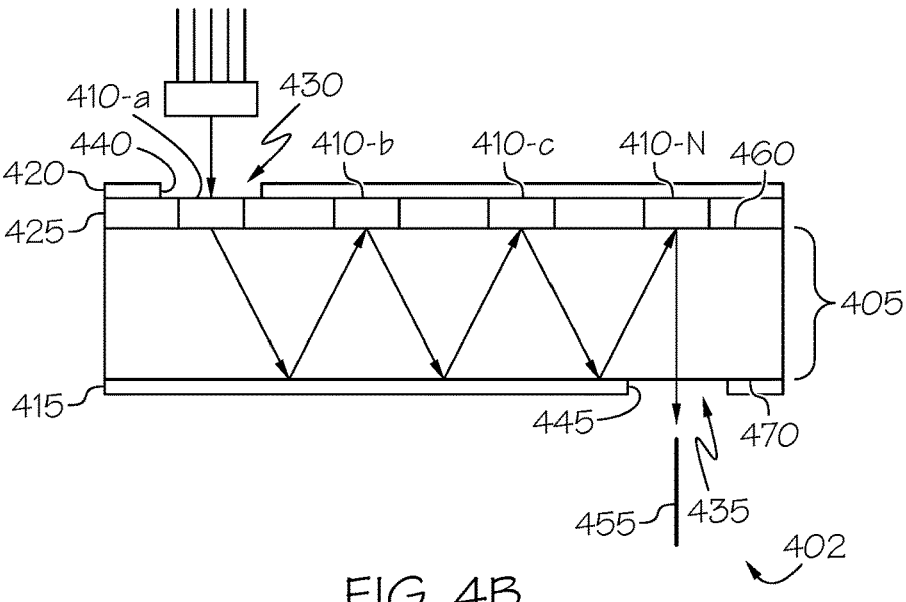
FIG. 4B schematically depicts an optical device manipulating an optical signal between an input fiber and an output fiber, the optical device comprising a plurality of reflective metasurfaces, according to one or more embodiments described herein.
Figure 4C:
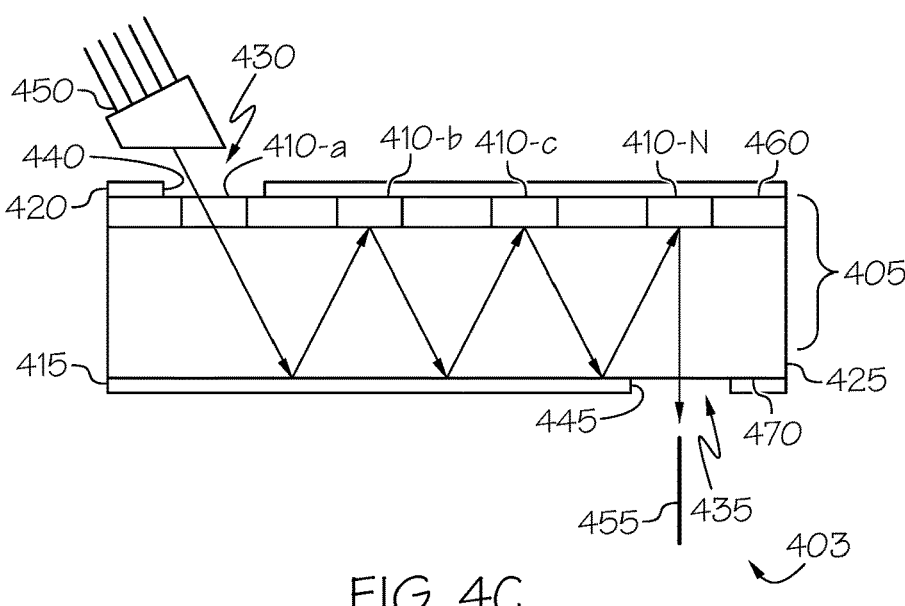
FIG. 4C schematically depicts an optical device manipulating an optical signal between an input fiber and an output fiber, the optical device comprising a plurality of reflective metasurfaces, according to one or more embodiments described herein.
Figure 4D:
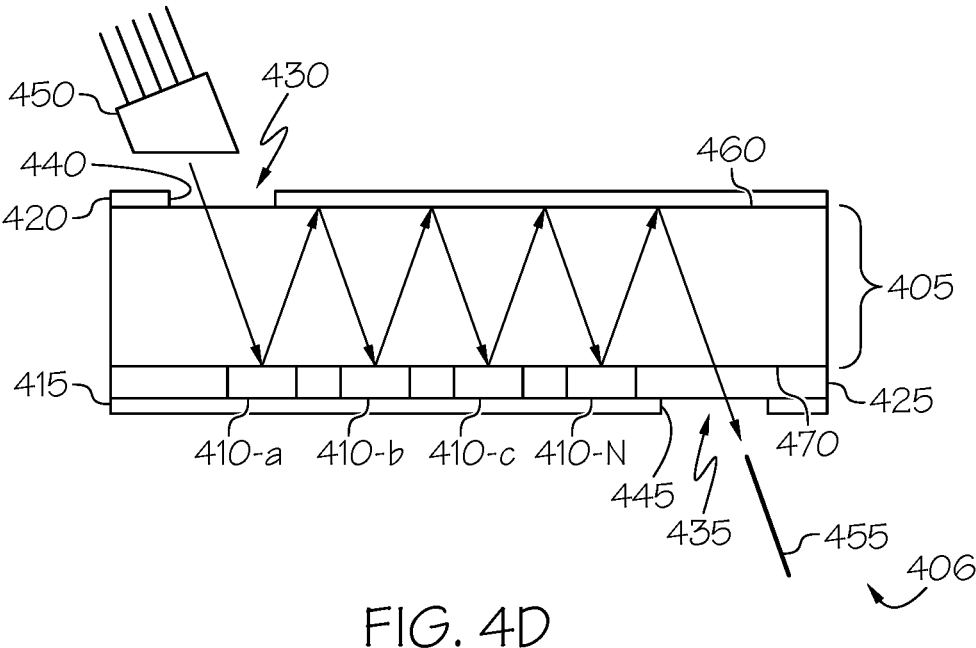
FIG. 4D schematically depicts an optical device manipulating an optical signal between an input fiber and an output fiber, the optical device comprising a plurality of reflective metasurfaces, according to one or more embodiments described herein.
Figure 4E:
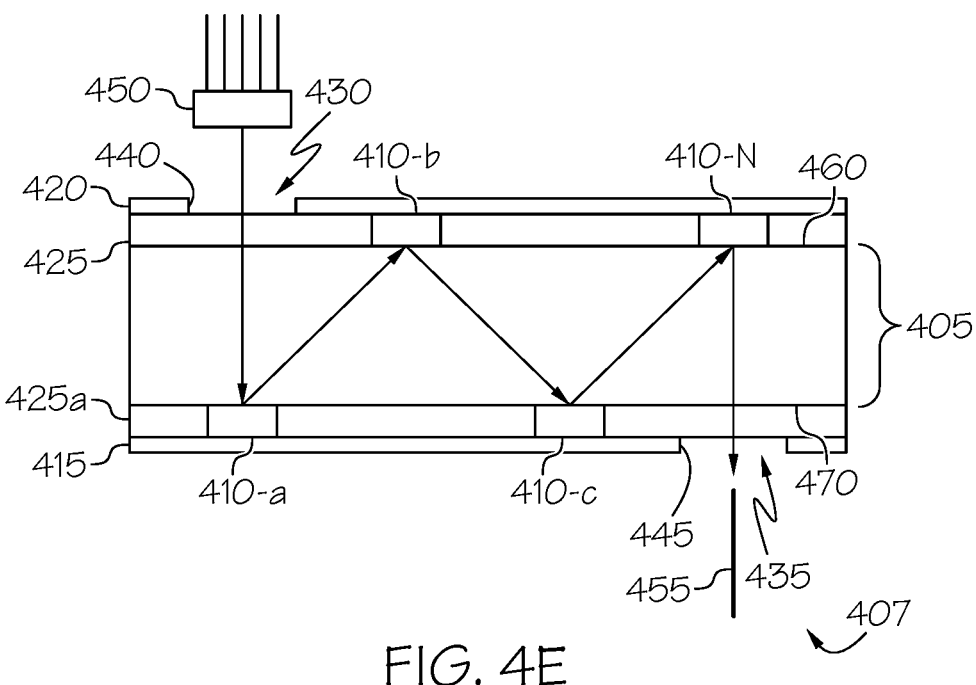
FIG. 4E schematically depicts an optical device manipulating an optical signal between an input fiber and an output fiber, the optical device comprising a plurality of reflective metasurfaces, according to one or more embodiments described herein.

In the optical device 401 depicted in FIG. 4A, each of the plurality of metasurfaces 410 is disposed on the same surface 460 of the transmissive substrate 405. Such an embodiment is beneficial in that the plurality of metasurfaces 410 may be formed in the same fabrication step (e.g., via the nanolithography techniques) using the same photomask. Such a process beneficially eliminates the need for multiple photomasks and subsequent alignment issues. While such an arrangement is beneficial for this reason, alternative embodiments where a portion of the plurality of metasurfaces 410 are disposed on the surface 460 and the remainder of the plurality of metasurfaces 410 are disposed on the surface 470 of the transmissive substrate 405 are contemplated and within the scope of the present disclosure. For example, FIG. 4E schematically depicts an optical device 407 where a first metasurface 410-a and a third metasurface 410-c are disposed on the surface 470, while a second metasurface 410-b and another metasurfaces 410-n are deposed on the surface 460. Such an embodiment may include an additional cladding 425-a disposed between the surface 470 and the first reflector 415.

In the example embodiment depicted in FIG. 4A, each of the plurality of metasurfaces 410 is configured as a reflective metasurface (e.g. the phase profile for each of the plurality of metasurfaces 410 is designed based on light from an optical signal interacting therewith multiple times). Embodiments are envisioned where a portion of the plurality of metasurfaces 410 are configured as a transmissive metasurface. For example, FIG. 4B schematically depicts an optical device 402 where a first metasurface 410-a is disposed at the input aperture 430 and configured as a transmissive metasurface. Another example optical device may include a transmissive metasurface at the output aperture 435.

In embodiments, the input aperture 430 and the output aperture 435 may be disposed on the same side of the transmissive substrate 405 (as in the optical device 401 depicted in FIG. 4A) or on opposing sides of transmissive substrate 405 (as in the optical device 402 depicted in FIG. 4B). In the examples depicted in FIGS. 4A and 4B input and output fibers 450 and 455 are held in spaced relation to the input and output apertures 430 and 435 such that the fibers extend substantially perpendicular to the transmissive substrate 405. In embodiments, any combination of the input and output fibers 450 and 455 may be held at an angle to the transmissive substrate 405 (or the input and output apertures 430 and 435). For example, FIG. 4C depicts an optical device 403 where the input fiber 450 comprises a polished face extending parallel to the plurality of metasurfaces 410, but the cores of the input fiber 450 extend at an angle to the plurality of metasurfaces 410. Such a configuration may beneficially prevent back reflections from interfering with an input optical signal emitted from the input fiber 450. FIG. 4D schematically depicts an optical device 406 where the plurality of metasurfaces 410 are disposed on the surface 470 opposite to the input aperture 430 and both the input fiber 450 and output fiber 455 comprise such polished angled surfaces. In embodiments the input fiber 450 and the output fiber 455 may comprise polished angles that are greater than or equal to 2 degrees and less than or equal to 20 degrees (e.g., greater than or equal to 8 degrees and less than or equal to 12 degrees).

In embodiments, the optical devices 401, 402, 403, 406, or 407 may be configured as examples of resonant folded designs. In such designs, the general structure of the optical devices is similar to folded designs. A difference between a folded design and a resonant folded design may include the design of the phase profiles of the metasurfaces. For example, in both stacked designs and folded designs, there may be a fixed number of times the light interacts with the metasurfaces. In a resonant folded design, however, it is possible for the light to interact with the metasurfaces a relatively large number of times (e.g., on the order of hundreds or thousands of times), or in essence an indefinite or infinite number of times. In a resonant folded design, the surfaces 460 and 470 of the transmissive substrate 405 may form a Fabry-Perot cavity, with the metasurfaces 410 positioned near such surfaces with one or more specific phase profiles. In embodiments, a single metasurface 410 can interact more strongly with the light as compared with designs where a single stage of metamaterials interacts with the light once.

In embodiments, the optical devices 401, 402, 403, 406, and 407 may be fabricated with a nanolithography process. For example, FIGS. 5A-5F depict an example of a method for manufacturing an optical signal manipulation device (e.g., the optical signal manipulation device 104 described herein with respect to FIG. 1A) in accordance with examples as disclosed herein. Each of FIGS. 5A-5F depict a perspective view of a cut-away portion of a larger optical device. The cut-away portion in each figure has been limited to depict how various aspects of the optical device are formed, but additional structures are contemplated and within the scope of the present disclosure. Any combination or portion of the operations described herein with respect to FIGS. 5A-5E may be used to form any of the optical devices described herein.

Figure 5A:
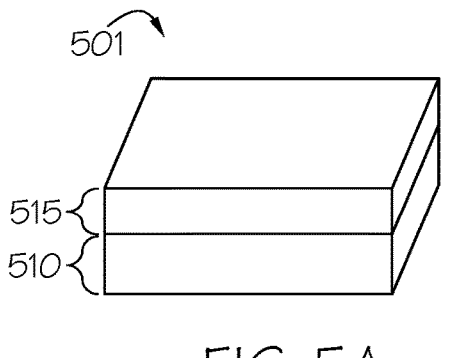
FIG. 5A schematically depicts a first operation in a fabrication process for fabricating a metasurface-based optical device, according to one or more embodiments described herein.

FIG. 5A schematically depicts an example of a first operation of a method for manufacturing an optical signal manipulation device. The first operation may not be the first step in the manufacturing process for the optical device, but it is the first operation described in FIGS. 5A-5F. FIG. 5A depicts an optical device 501 that includes a substrate 510 and a metasurface layer 515. The first operation may include forming the substrate 510 (e.g., by one or more deposition steps and/or one or more etching steps). The substrate 510 may be an example of the transmissive substrates 206, 238, 307, and 405 described herein. In embodiments, the substrate 510 may be formed of glass or fused silica. In embodiments, the substrate 510 may be grown rather than deposited. The terms deposited and grown may be used interchangeably herein. In embodiments, as part of the first operation, the metasurface layer 515 may be deposited on the substrate 510. In embodiments, the metasurface layer 515 may be an example of the material out of which a plurality of nanostructures of a metasurface are formed.

Figure 5B:
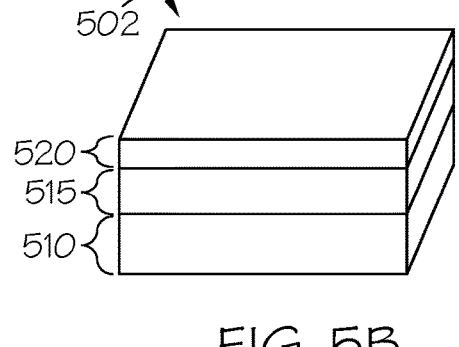
FIG. 5B schematically depicts a second operation in a fabrication process for fabricating a metasurface-based optical device, according to one or more embodiments described herein.

FIG. 5B schematically depicts an example of a second operation of a method for manufacturing an optical signal manipulation device. The second operation occurs after the first operation described with reference to FIG. 5A. In embodiments, other steps or operations may occur between the first operation and the second operation. FIG. 5B depicts an optical device 502 that includes the substrate 510, the metasurface layer 515, and a resist layer 520. In the second operation, the resist layer 520 is deposited or coated on the metasurface layer 515. In embodiments, the resist layer 520 may be an example of a hard mask material or sacrificial layer, or any combination thereof.

Figure 5C:
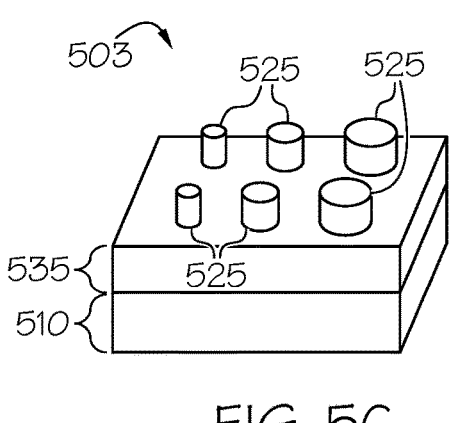
FIG. 5C schematically depicts a third operation in a fabrication process for fabricating a metasurface-based optical device, according to one or more embodiments described herein.

FIG. 5C schematically depicts an example of a third operation of a method for manufacturing an optical signal manipulation device. The third operation occurs after the second operation described with reference to FIG. 5B. In embodiments, other steps or operations may occur between the second operation and the third operation. FIG. 5C depicts an optical device 503 that includes the substrate 510, the metasurface layer 515, and a plurality of hardmasks 525 formed from the resist layer 520. In the third operation, portions of the resist layer 520 are removed to form the plurality of hardmasks 525. Each hardmask 525 of the plurality of hardmasks include one or more parameters (e.g., cross-sectional profile, cross-sectional area, or height) that are configured to control the parameters of the nanostructures in the metasurface layer 515 that result from the plurality of hardmasks 525. The plurality of hardmasks 525 may be formed using one or more etching processes, e-beam lithography, photolithography, nanoimprint, or any combination thereof.

Figure 5D:
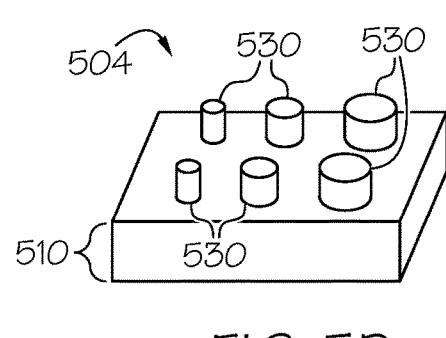
FIG. 5D schematically depicts a fourth operation in a fabrication process for fabricating a metasurface-based optical device, according to one or more embodiments described herein.

FIG. 5D schematically depicts an example of a fourth operation of a method for manufacturing an optical signal manipulation device. The fourth operation occurs after the third operation described with reference to FIG. 5C. In embodiments, other steps or operations may occur between the third operation and the fourth operation. FIG. 5D depicts an optical device 504 that includes the substrate 510 and a plurality of nanostructures 530 formed from the metasurface layer 515. The plurality of nanostructures 530 were formed based on the parameters of the plurality of hardmasks 525. In the fourth operation, portions of the metasurface layer 515 and the plurality of hardmasks 525 are removed to form the plurality of of the plurality of nanostructures 530 include one or more parameters (e.g., cross-sectional profile, cross-sectional area, or height) that are configured based on the parameters of the hardmasks initially positioned above the metamaterial structure. The plurality of nanostructures 530 may be formed using one or more etching processes, e-beam lithography, photolithography, nanoimprint, or any combination thereof. In embodiments, a single process from the processes listed above may be used as part of the fourth operation. In embodiments, two or more processes from the processes listed above may be used as part of the fourth operation.

Figure 5E:
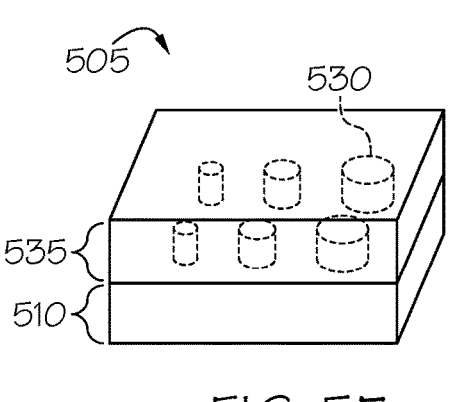
FIG. 5E schematically depicts a fifth operation in a fabrication process for fabricating a metasurface-based optical device, according to one or more embodiments described herein.

FIG. 5E schematically depicts an example of a fifth operation of a method for manufacturing an optical signal manipulation device. The fifth operation occurs after the fourth operation described with reference to FIG. 5D. In embodiments, other steps or operations may occur between the fourth operation and the fifth operation. FIG. 5E depicts an optical device 505 that includes the substrate 510, a plurality of nanostructures 530, and a cladding 535. In the fifth operation, the cladding 535 is deposited on the substrate 510 and the plurality of nanostructures 530. The cladding 535 may be an example of the cladding 240 or the claddings 425 described herein. The cladding 535 may be configured to protect the nanostructures 530 from damage, mitigate losses of optical signals interacting with the nanostructures, or any combination thereof.

Figure 5F:
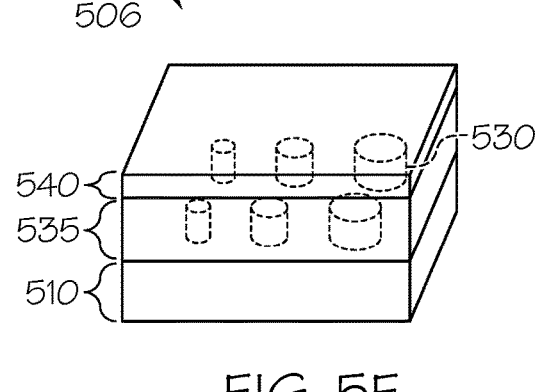
FIG. 5F schematically depicts a sixth operation in a fabrication process for fabricating a metasurface-based optical device, according to one or more embodiments described herein.

FIG. 5F schematically depicts an example of a sixth operation of a method for manufacturing an optical signal manipulation device. The sixth operation occurs after the fifth operation described with reference to FIG. 5D. In embodiments, other steps or operations may occur between the fifth operation and the sixth operation. FIG. 5F depicts an optical device 506 that includes the substrate 510, a plurality of nanostructures 530, the cladding 535, and a reflector 540. In the sixth operation, a material is deposited to form the reflector 540. In embodiments, the material is a reflective material (e.g., a metal such as gold). In embodiments, the material is coated with a reflective material (e.g., a metal such as gold) to form the reflector 540. The reflector 540 may be formed to be positioned in proximity to or in contact with the cladding 535. In embodiments, the cladding 535 is positioned between the nanostructures 530 and the reflector 540. The reflector 540 may be an example of the reflectors 242, 420, and 425 described herein.

The method described herein with respect to FIGS. 5A-5E may be referred to as a "top-down approach", where a material used for the nanostructures is put on the substrate 510 as described in FIG. 5A by processes such as wafer bonding and/or film deposition processes such as plasma enhanced chemical vapor deposition (PECVD), low pressure chemical vapor deposition (LPCVD), atomic layer deposition (ALD), thermal evaporation, e-beam evaporation, sputtering, and so on. The techniques for patterning the structure (e.g., FIGS. 5B and 5C) can be lithography methods, such as e-beam lithography, photolithography, nanoimprint lithography, or any combination thereof. Other techniques such as self-assembly may also be utilized to pattern the device. Depending on the techniques and materials chosen for the device, different resist and etching techniques can be employed to transfer the pattern to the metamaterial layer as shown in FIG. 5D (e.g., the techniques can be dry etching techniques, such as reactive ion etching, inductively coupled plasma etching, or ion milling, or any combination thereof). In embodiments, another layer of other materials can be added on top of the thin film layer (e.g., the metasurface layer 515) to act as a hard mask in the etching process, instead of using the resist as the etching mask. Depending on the design, a cladding layer can be added to protect or support the structure, which may be added using coating techniques (such as spin coating) or deposition techniques described herein (e.g., as shown in FIG. 5E). The reflector (e.g., metal) layer can be added on top of the cladding layer using deposition techniques described herein (e.g., as shown in FIG. 5F).

Alternative methods than that described herein with respect to FIGS. 5A-5F may be used to manufacture the optical signal manipulation devices described herein. FIGS. 6A-6F depict an example of a method for manufacturing an optical signal manipulation device. Each of FIGS. 6A-6F depict a perspective view of a cut-away portion of a larger optical device. The cut-away portion in each figure has been limited to depict how various aspects of the optical device are formed, but additional structure and functionality are contemplated. Any combination or portion of the operations described herein may in FIGS. 6A-6E be used to form any of the optical devices described herein.

Figure 6A:
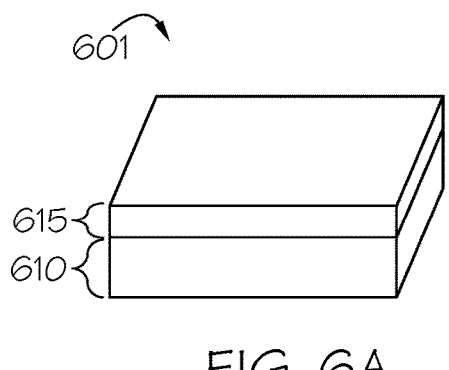
FIG. 6A schematically depicts a first operation in a fabrication process for fabricating a metasurface-based optical device, according to one or more embodiments described herein.

FIG. 6A depicts an example of a first operation of a method for manufacturing an optical signal manipulation device. The first operation may not be the first step in the manufacturing process for the optical device, but it is the first operation described in FIGS. 6A-6F. FIG. 6A depicts an optical device 601 that includes a substrate 610 and a resist layer 615. The first operation may include forming the substrate 610 (e.g., by one or more deposition steps and/or one or more etching steps). In embodiments, the first operation comprises depositing a resist layer 615 on the substrate 610. In embodiments, the resist layer 615 may be an example of a hard mask material or sacrificial layer, or any combination thereof.

Figure 6B:
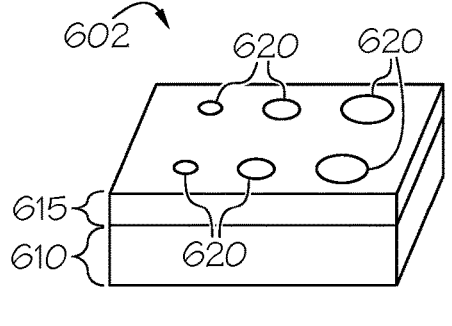
FIG. 6B schematically depicts a second operation in a fabrication process for fabricating a metasurface-based optical device, according to one or more embodiments described herein.

FIG. 6B depicts an example of a second operation of a method for manufacturing an optical signal manipulation device. The second operation occurs after the first operation described with reference to FIG. 6A. In embodiments, other steps or operations may occur between the first operation and the second operation. FIG. 6B depicts an optical device 602 that includes the substrate 610, the resist layer 615, and a plurality of cavities 620 formed in the resist layer 615. In the second operation, portions of the resist layer 615 are removed to form the plurality of cavities 620. In embodiments, a pattern of the resist layer 615 may be etched. Each cavity 620 of the plurality of cavities may include one or more parameters (e.g., cross-sectional profile, cross-sectional area, or height) that are configured to control the parameters of the nanostructures that result from the plurality of cavities 620. The plurality of cavities 620 may be formed using one or more etching processes, e-beam lithography, photo-lithography, nanoimprint, or any combination thereof.

Figure 6C:
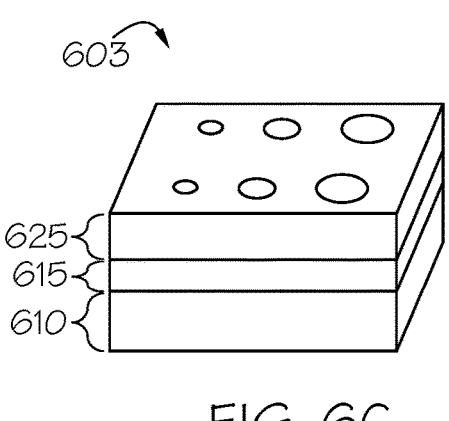
FIG. 6C schematically depicts a third operation in a fabrication process for fabricating a metasurface-based optical device, according to one or more embodiments described herein.

FIG. 6C depicts an example of a third operation of a method for manufacturing an optical signal manipulation device. The third operation occurs after the second operation described with reference to FIG. 6B. In embodiments, other steps or operations may occur between the second operation and the third operation. FIG. 6C depicts an optical device 603 that includes the substrate 610, the resist layer 615, and the metasurface layer 625. In the third operation, the metasurface layer 625 may be deposited on the resist layer 615 and in the plurality of cavities 620 formed in the resist layer 615. In embodiments, the metasurface layer 625 may be an example of metamaterials that are used to form the nanostructures in the finished optical device. The metasurface layer 625 may be an example of the plurality of nanostructures used in the metasurfaces described herein. In embodiments, the metasurface layer 625 may also include a plurality of cavities after being deposited. In embodiments, the thickness of the deposited film may be uniform across the device. In embodiments, material of the metasurface layer 625 that fills the plurality of cavities 620 may leave a similar cavity above it in the metasurface layer 625.

Figure 6D:
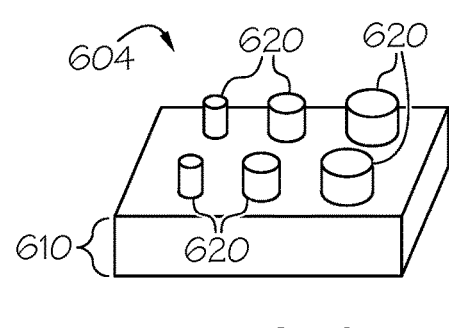
FIG. 6D schematically depicts a fourth operation in a fabrication process for fabricating a metasurface-based optical device, according to one or more embodiments described herein.

FIG. 6D depicts an example of a fourth operation of a method for manufacturing an optical signal manipulation device. The fourth operation occurs after the third operation described with reference to FIG. 6C. In embodiments, other steps or operations may occur between the third operation and the fourth operation. FIG. 6D depicts an optical device 604 that includes the substrate 610 and a plurality of nanostructures 630 formed from the metasurface layer 625 and were formed based on the parameters of the plurality of cavities 620. In the fourth operation, portions of the metasurface layer 625 and the remaining portions of the resist layer 615 are removed to form (or expose) the plurality of nanostructures 630. Each metamaterial structure 630 of the plurality of nanostructures include one or more parameters (e.g., cross-sectional profile, cross-sectional area, or height) that are configured based on the parameters of the cavities into which the metasurface layer 625 was deposited. In embodiments, one or more chemicals may be applied to the optical device 604 to remove the remaining resist layer and the metamaterials that are on top of the remaining resist layer. In embodiments, this procedure may be referred to as lift-off. The plurality of nanostructures 630 may be formed using one or more etching processes, e-beam lithography, photo-lithography, nanoimprint, or a lift-off process, or any combination thereof. In embodiments, a single process from the processes listed above may be used as part of the fourth operation. In embodiments, two or more processes from the processes listed above may be used as part of the fourth operation.

Figure 6E:
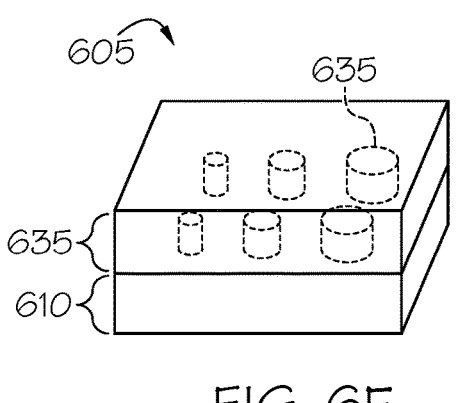
FIG. 6E schematically depicts a fifth operation in a fabrication process for fabricating a metasurface-based optical device, according to one or more embodiments described herein.

FIG. 6E depicts an example of a fifth operation of a method for manufacturing an optical signal manipulation device. The fifth operation occurs after the fourth operation described with reference to FIG. 6D. In embodiments, other steps or operations may occur between the fourth operation and the fifth operation. FIG. 6E depicts an optical device 605 that includes the substrate 610, a plurality of nanostructures 630, and cladding 635. In the fifth operation, cladding 635 is deposited on the substrate 610 and the plurality of nanostructures 630.

Figure 6F:
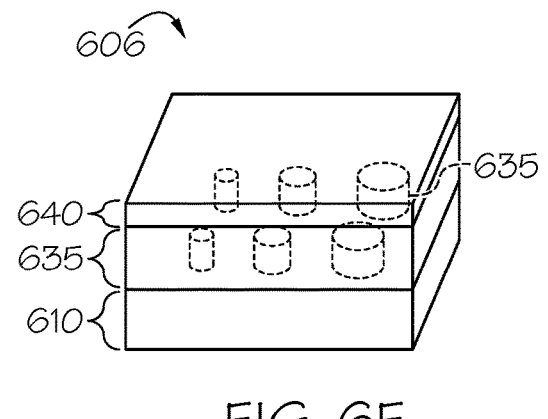
FIG. 6F schematically depicts a sixth operation in a fabrication process for fabricating a metasurface-based optical device, according to one or more embodiments described herein.

FIG. 6F depicts an example of a sixth operation of a method for manufacturing an optical signal manipulation device. The sixth operation occurs after the fifth operation described with reference to FIG. 6E. In embodiments, other steps or operations may occur between the fifth operation and the sixth operation. FIG. 6F depicts an optical device 606 that includes the substrate 610, a plurality of nanostructures 630, cladding 635, and a reflector 640. In the sixth operation, a material is deposited to form the reflector 640. In embodiments, the material is a reflective material (e.g., a metal such as gold). In embodiments, the material is coated with a reflective material (e.g., a metal such as gold) to form the reflector 640. The reflector 640 may be formed to be positioned in proximity to or in contact with the cladding 635. In embodiments, the cladding 635 is positioned between the nanostructures 630 and the reflector 640.

The method described herein with respect to FIGS. 6A-6E may be referred to as a "bottom-up approach", where the inverse pattern of the desired structure can be first created using lithography techniques, similar to the top-down approach (e.g., see FIGS. 6A and 6B). A thin film layer may then be grown on top of the patterned resist layer 615, filling the holes (e.g., see FIG. 6C). After a lift-off process (e.g., see FIG. 6D), the resist layer 615 as well as the thin film on top the resist can be removed, and the pattern is transferred to the thin film layer to become the nanostructures. Depending on the design, a cladding layer can be added to protect or support the structure, using coating techniques (such as spin coating) or deposition techniques described herein (e.g., as shown in FIG. 6E). The reflector (e.g., metal) layer can be added on top of the cladding layer using deposition techniques described herein (e.g., as shown in FIG. 6F).

EXAMPLES

Each of the following examples used a similar core design for the input fiber and the output fiber thereof. In the following examples, the cores of the input and output fibers (whether they be a single core fiber array or a multi-core fiber array) comprise same step index profile design, with core Δ of 0.34% and core radius of 4.4 μm, where Δ is a relative refractive index relative to pure silica. The relative refractive index may be defined as $$\Delta\% = 100\frac{n^2 - n_c^2}{2n^2} \quad (1)$$

where n is the refractive index of the core at a wavelength of 1550 nm, unless otherwise specified, and $n_c$ is 1.444, which is the refractive index of undoped silica glass at a wavelength of 1550 nm.

The cores may comprise a mode field diameter of about 10.4 μm at 1550 nm. It should be understood that single mode profile designs comprising other features, such as graded index core designs, may also be used. The present disclosure is not limited to any particular core or fiber structure. In embodiments, a low index trench can be added to reduce the bending loss and core spacing.

Figures 7B, 7C:
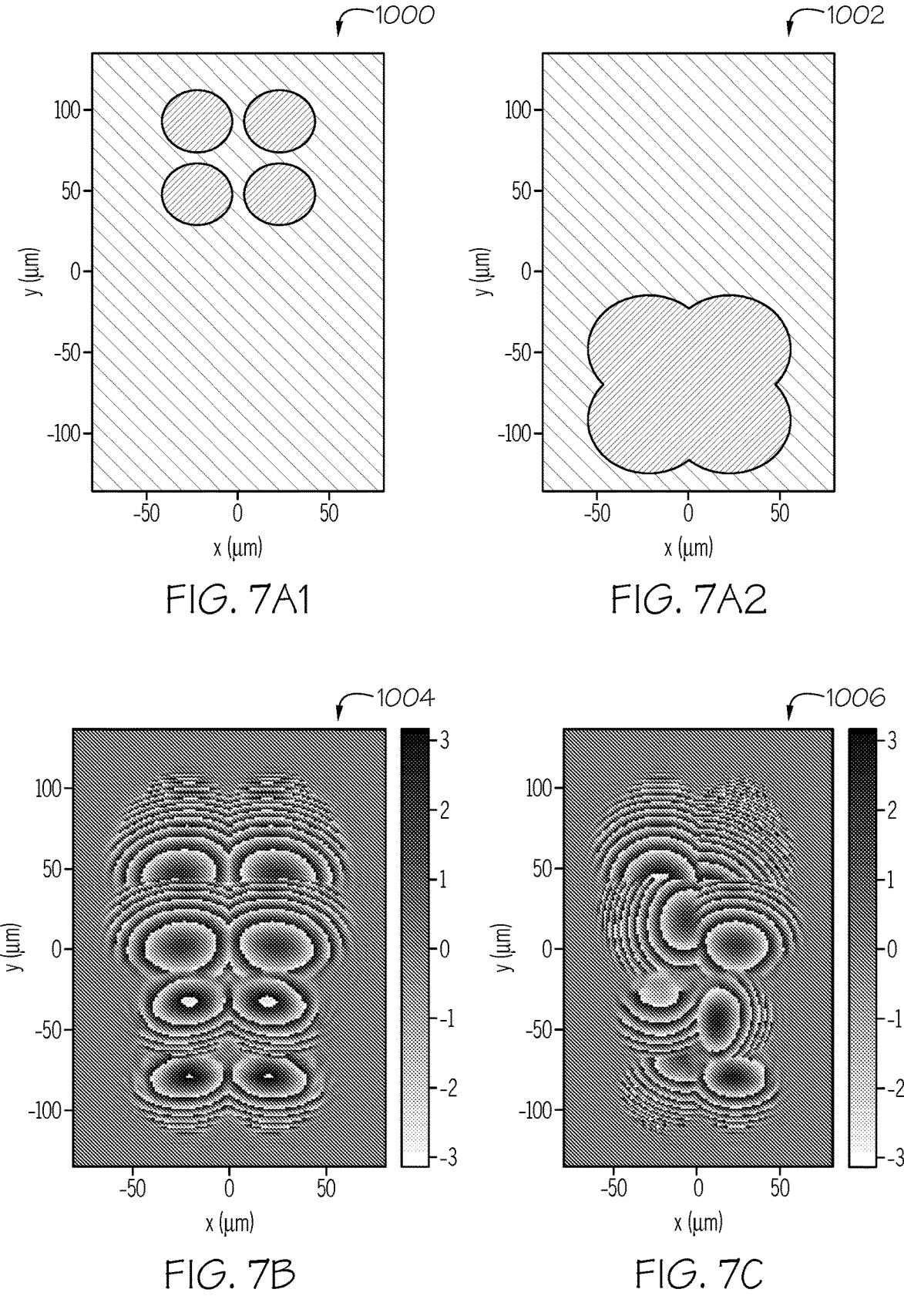
FIG. 7B depicts a first combined phase profile for the example optical device having the input and output apertures of FIG. 7A such that the optical device functions as a fiber coupler, according to one or more embodiments described herein.
FIG. 7C depicts a second combined phase profile for the example optical device having the input and output apertures of FIG. 7A such that the optical device functions as a mode shuffler, according to one or more embodiments described herein.

FIGS. 7A-7C schematically depict various aspects of an optical signal manipulation device configured to operate as either a multi-core fiber coupler, a fiber mode shuffler, or a power splitter depending on the combined phase profile selected for the plurality of metasurfaces therein. The optical signal manipulation device described with respect to FIGS. 7A-7C may have a structure similar to the optical device 402 described herein with respect to FIG. 4B. The transmissive substrate 405 has a thickness of 200 μm. Both the input and output fibers 450 and 455 comprise a 2×2 multi-core fiber with a core-to-core spacing of 45 μm. The input and output fibers 450 and 455 each comprise an angled polished surface disposed at an angle of 8 degrees relative to the plurality of metasurfaces 410. The input fiber 450 was held in spaced relation from the input aperture 430 at a distance of 45 μm, while the output fiber 455 was held in space relation from the output aperture 435 at a distance of 100 μm.

FIG. 7A1 depicts an input aperture 1000 and FIG. 7A2 depicts an output aperture 1002 of the optical signal manipulation device. The input aperture 1000 (e.g., an aperture mask) comprises a plurality of openings shaped in a manner that correspond to the cores of the input fiber 450. The output aperture 902 comprises a plurality of openings shaped in a manner that correspond to the cores of the output fiber 455. The openings in the input aperture 1000 are closer together than the openings in the output aperture 1002 given that the input fiber 450 is held closer to the transmissive substrate 105 in this example.

FIG. 7B depicts a first combined phase profile 1004 associated with a fiber coupler. The first combined phase profile 1004 may depict a combined phase response of the plurality of metasurfaces 410 of the optical signal manipulation device. The combined phase profile 1004 is symmetrical and is configured to re-direct optical signals propagating from the input fiber 450 to corresponding channels in the output fiber 455 (e.g., maintain a spatial arrangement of the optical signals between the input optical signal and the output optical signal). As depicted, the combined phase profile 1004 comprises a symmetrical arrangement of features, indicating a lack of crossover or combining between the optical signals. For example, a first metasurface 410-a may collimate the four optical signals of the input optical signal and redirect the optical signals towards a second (reflective) metasurface 410-b, which may focus and re-direct the optical signals towards corresponding cores of the output fiber 455.

Table 1 provides the simulated insertion loss between various channel pairings between the input fiber 450 and the output fiber 455 when the plurality of metasurfaces 410 have the combined phase profile 1004. As shown, the insertion loss is relatively low along the channel-to-channel matching instance between the input and output fibers 450 to 455, indicating success of the optical signal manipulation device in coupling cores of different multi-core fibers.

TABLE 1

| | MCF2 | | | |
|---|---|---|---|---|
| MCF1 | 1 | 2 | 3 | 4 |
| 1 | 0.129 | 47.6 | 65.1 | 97.8 |
| 2 | 47.6 | 0.129 | 100.6 | 65.0 |
| 3 | 66.1 | 94.0 | 0.130 | 47.0 |
| 4 | 95.1 | 65.9 | 47.0 | 0.130 |

FIG. 7C depicts a second combined phase profile 1006 associated with a fiber mode shuffler. The second combined phase profile 1006 depicts a combined phase response of the plurality of metasurfaces 410 of the optical signal manipulation device. As depicted in FIG. 7C, the combined phase profile 1006 is asymmetrical and comprises an arrangement of features (each arrangement of features may comprise a plurality of nanostructures with sub-wavelength separation positioned to manipulate one of the optical signals propagating through the signal manipulation device) that does not correspond to the arrangement of cores in the multi-core input and output fibers 450 and 455. The combined phase profile 1006 comprises a plurality of features that are arranged in a manner that does not correspond the arrangements of the fiber cores associated with the input aperture 1000 and the output aperture 1002. Such an arrangement of features may indicate that the plurality of metasurfaces 410 are modifying wavefront tilts of different ones of the four optical signals of the input optical signal in different ways to alter an arrangement of the optical signals. In the depicted example, the combined phase profile 1006 may cause an optical signal propagating in a first channel of the input fiber 450 (associated with an opening 1001 of the input aperture 1000 of FIG. 7A) to switch places with an optical signal propagating in a second channel of the input fiber 450 (e.g., associated with an opening 1003 of the input aperture 1000 of FIG. 7A) at the output aperture 1002. That is, the overall spatial arrangement of optical signals may be maintained, but the relative spatial arrangement of the optical signals may be adjusted by the optical signal manipulation device. At least two of the optical signals may intersect within the optical signal manipulation device to alter the relative spatial arrangement of the optical signals between the input aperture 1000 and the output aperture 1002.

Table 2 provides the simulated insertion loss between various channel pairings between the input fiber 450 and the output fiber 455 when the plurality of metasurfaces have the combined phase profile 1006. As shown, the second optical channel of the input fiber 450 is optically switched to the third channel of the output fiber 455, indicating successful operation of the optical signal manipulation device as a fiber mode shuffler. The combined phase profile of the optical signal manipulation devices described herein may be adjusted to achieve any permutation of channel coupling among any combination of input and output fibers, demonstrating the flexibility of the metasurfaces described herein.

TABLE 2

| | MCF2 | | | |
|---|---|---|---|---|
| MCF1 | 1 | 2 | 3 | 4 |
| 1 | 0.139 | 60.6 | 60.1 | 72.3 |
| 2 | 60.2 | 102.8 | 0.137 | 58.9 |
| 3 | 60.0 | 0.136 | 88.5 | 60.6 |
| 4 | 81.2 | 61.8 | 61.2 | 0.135 |

Figure 8A:
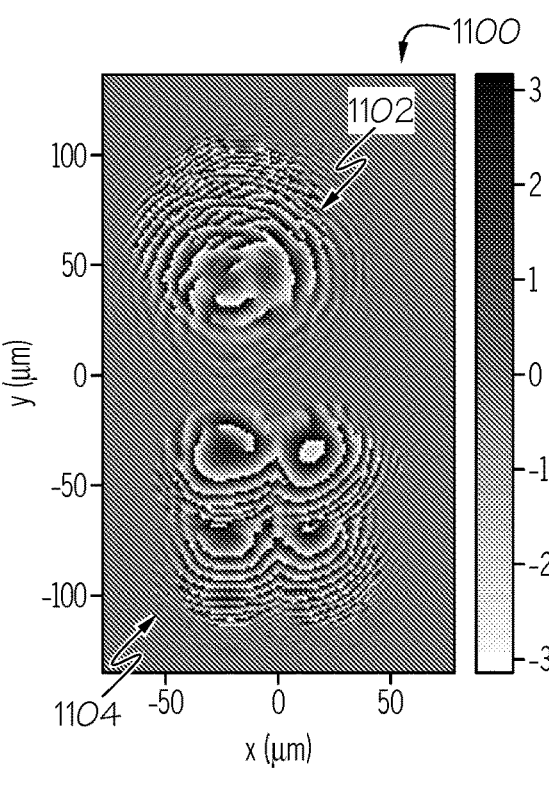
FIG. 8A depicts a third combined phase profile for the example optical device having the input and output apertures of FIG. 7A such that the optical device functions as a power splitter, according to one or more embodiments described herein.

By tailoring the combined phase profile of the example optical signal manipulation device described with respect to FIGS. 7A-7C, optical signal manipulation devices possessing differing functionalities may be achieved. For example, FIG. 8A depicts a third combined phase profile 1100 for an optical signal manipulation device functioning as a power splitter. The power splitter may be structured similar to the optical signal manipulation device described with respect to FIGS. 7A-7C (e.g., having the same input and output fiber arrangement), with the pluralities of nanostructures of the plurality of metasurfaces 410 being modified to achieve the third combined phase profile 1100.

The third combined phase profile 1100 comprises a first plurality of features 1102 associated with a first channel of the input optical signal (e.g., entering the optical signal manipulation device through a first one of the openings of the input aperture 1000 of FIG. 7A). The first plurality of features 1102 may be associated with a first metasurface 410-a that manipulate the phase profile of various portions of an optical signal propagating through the first channel in different ways. The first metasurface 410-a may spatially separate the portions of the optical signal. The third combined phase profile 1100 also comprises a second plurality of features 1104 (e.g., associated with a second metasurface 410-b) that re-direct the separated portions of the optical signal to different channels of the output fiber 455. Table 3 depicts the insertion loss of the channel coupling between the input and output fibers 450 and 455 of this example. In table 3, an insertion loss of 6.02 dB represents a quarter of an optical signal coupled into a particular channel. As shown, the first channel of the input fiber 450 is basically split into four equal components that are coupled to each of the four channels of the output fiber 455, indicating successful operation of the signal manipulation device as a power splitter.

TABLE 3

| | MCF2 | | | |
|---|---|---|---|---|
| MCF1 | 1 | 2 | 3 | 4 |
| 1 | 6.41 | 6.42 | 6.43 | 6.43 |
| 2 | 49.1 | 56.7 | 52.9 | 64.4 |
| 3 | 43.7 | 53.3 | 59.7 | 59.5 |
| 4 | 56.6 | 67.1 | 78.4 | 79.9 |

Figure 8B:
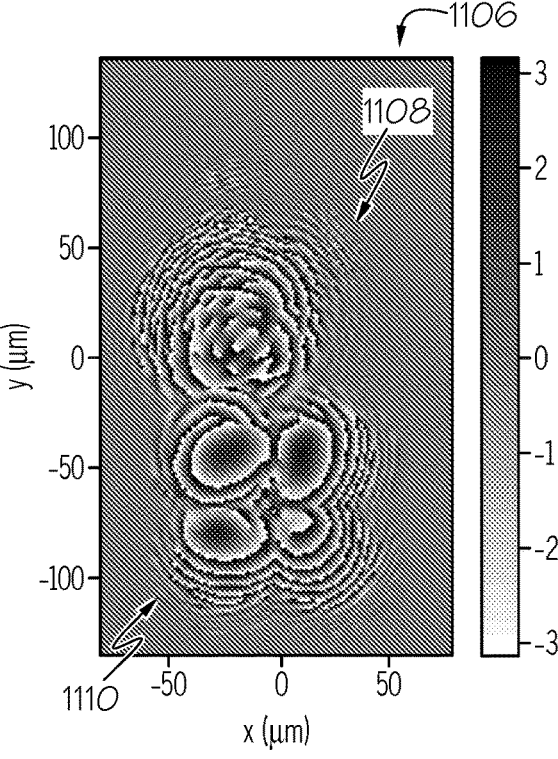
FIG. 8B depicts a fourth combined phase profile for the example optical device having the input and output apertures of FIG. 7A such that the optical device functions as a power splitter, according to one or more embodiments described herein.

In another example, a third optical channel of the input fiber 450 may be split into the four channels of the output fiber 455. FIG. 8B depicts a fourth combined phase profile 1106 of an optical signal manipulation device similar to the one described herein with respect to FIG. 8A, with the exception that the fourth combined phase profile 1106 comprises a first plurality of features 1108 spatially aligned with a third channel of the input fiber 450 (e.g., a different opening in the input aperture 1000 of FIG. 7A). The fourth combined phase profile 1106 comprises a second plurality of features 1110 that re-direct portions of an optical signal separated by the first plurality of features 1108 towards cores of the output fiber 455 to achieve a function similar to the optical signal manipulation device described herein with respect to FIG. 8A. Table 4 depicts the insertion loss of the channel coupling between the input and output fibers 450 and 455 of this example. In table 4, an insertion loss of 6.02 dB represents a quarter of an optical signal coupled into a particular channel. As shown, the third channel of the input fiber 450 is basically split into four equal components that are coupled to each of the four channels of the output fiber

455, indicating successful operation of the signal manipulation device as a power splitter. In embodiments, the optical signal manipulation devices described herein with respect to FIGS. 8A and 8B may be operated in reverse to provide power combining.

TABLE 4

| MCF1 | MCF2 | | | |
| | 1 | 2 | 3 | 4 |
|---|---|---|---|---|
| 1 | 80.4 | 61.4 | 54.6 | 55.4 |
| 2 | 70.7 | 61.3 | 64.3 | 79.5 |
| 3 | 6.40 | 6.41 | 6.40 | 6.41 |
| 4 | 55.3 | 54.7 | 52.2 | 63.4 |

Figure 8C:
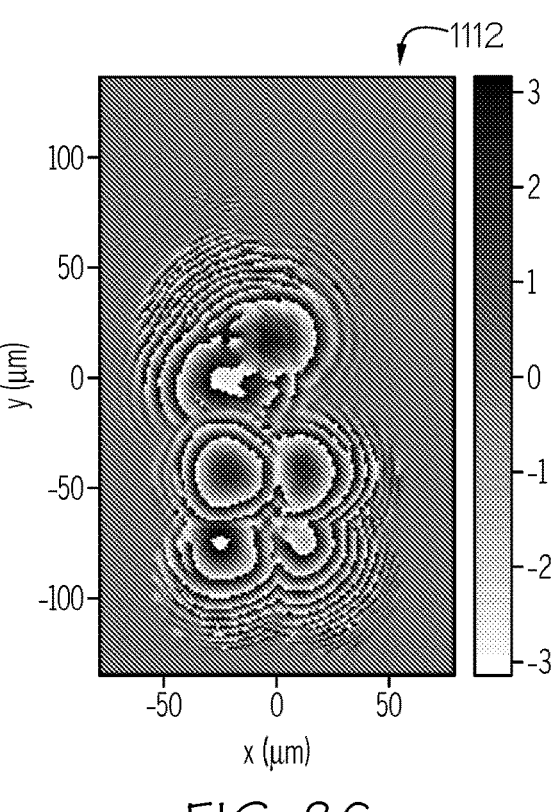
FIG. 8C depicts a fifth combined phase profile for the example optical device having the input and output apertures of FIG. 7A such that the optical device functions as a power splitter, according to one or more embodiments described herein.

The preceding power splitter examples described with respect to FIGS. 8A and 8B achieved an equal distribution of power between the channels of the output fiber 455. The combined phase profile of the plurality of metasurfaces 410 may be adjusted to achieve any desired arbitrary power distribution amongst the output channel. For example, for a power splitter with 2 of the metasurfaces 410 the figure of merit ("FOM") for a power splitter optical signal manipulation device may be defined as $$FOM_{ver1} = \min_j \left[ power_j / ratio_j \right] \qquad (2)$$

where $power_j$ represents the portion of the input signal in the channel j that is routed to the output fiber 455 and $ratio_j$ is the target splitting ratio. The desired FOM according to equation 1 may then be used (e.g., in an adjoint analysis) to construct the nanostructures of each of the pluralities of metasurfaces 410. FIG. 8C depicts a fifth combined phase profile 1112 that is similar in function to the fourth combined phase profile 1106 depicted in FIG. 8B, but structured to achieve a particular power ratio in accordance with equation 2. Table 5 provides simulated coupling efficiency losses between the third channel of the input fiber 450 and all the channels of the output fiber 455. The power ratio of each of the signals in the output fiber 455 is different than that achieved vie the fourth combined phase profile 1106 of FIG. 8B, indicating that the splitting ratio achieved via the optical signal manipulation devices described herein may be arbitrarily adjusted via metasurface configuration.

TABLE 5

| MCF₁ | MCF₂ | | | |
| | 1 | 2 | 3 | 4 |
|---|---|---|---|---|
| 1 | 0 | 0 | 0 | 0 |
| 2 | 0 | 0 | 0 | 0 |
| 3 | 0.099 | 0.190 | 0.277 | 0.362 |
| 4 | 3e−4 | 1e−4 | 0 | 0 |

Figure 8D:
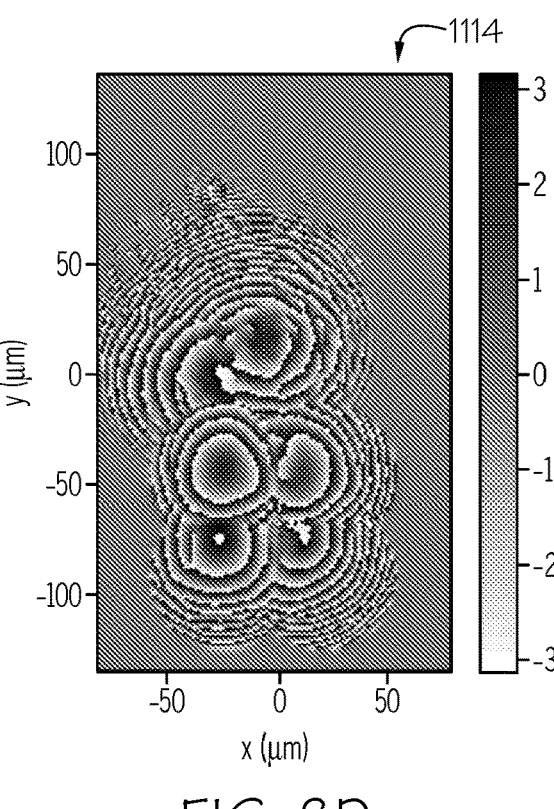
FIG. 8D depicts a sixth combined phase profile for the example optical device having the input and output apertures of FIG. 7A such that the optical device functions as a power splitter, according to one or more embodiments described herein.

In another example, the FOM may be defined as $$FOM_{ver2}^{(n)} = \Sigma_j \frac{ratio_j^n}{power_j^{n-1}} \qquad (3)$$

where n is a hyper-parameter that may be adjusted depending on the required accuracy for the target splitting ratio $$ratio_j^n$$

and $$power_j^{n-1}$$

represents the portion of the input signal in the channel j that is routed to the output fiber 455. In embodiments, the hyper-parameter n may vary from 2 to 32 (e.g., increase from 2 to a number less than or equal to 32, depending on a desired accuracy of the splitting ratio), to achieve a balance between efficient optimization and splitting accuracy. The desired FOM according to equation 3 may then be used (e.g., in an adjoint analysis) to configure the nanostructures of each of the pluralities of metasurfaces 410 of the optical signal manipulation device. FIG. 8D depicts a sixth combined phase profile 1114 that is similar in function to the fourth combined phase profile 1106 depicted in FIG. 8B, but structured to achieve a particular power ratio in accordance with equation 3. Table 6 provides simulated coupling efficiency losses between the third channel of the input fiber 450 and all the channels of the output fiber 455. The power ratio of each of the signals in the output fiber 455 is different than that achieved vie the fifth combined phase profile 1112 of FIG. 8C, indicating that the splitting ratio achieved via the optical signal manipulation devices described herein may be arbitrarily adjusted.

TABLE 6

| MCF₁ | MCF₂ | | | |
| | 1 | 2 | 3 | 4 |
|---|---|---|---|---|
| 1 | 0 | 0 | 0 | 0 |
| 2 | 0 | 0 | 0 | 0 |
| 3 | 0.093 | 0.186 | 0.279 | 0.372 |
| 4 | 1e−4 | 4e−5 | 1e−5 | 0 |

Figure 9B:
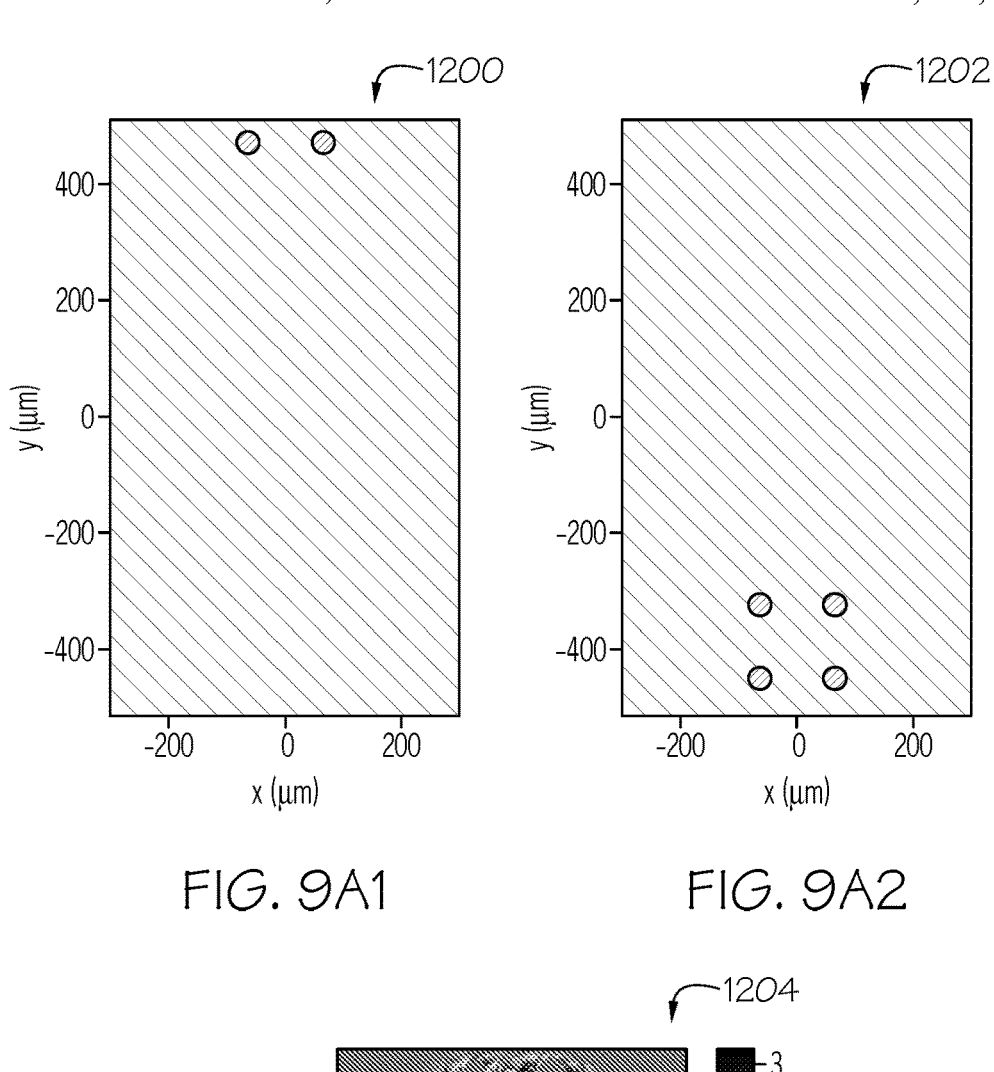
FIG. 9B depicts a combined phase profile for the example optical device having the input and output apertures of FIG. 9A, according to one or more embodiments described herein.
Figure 9B:
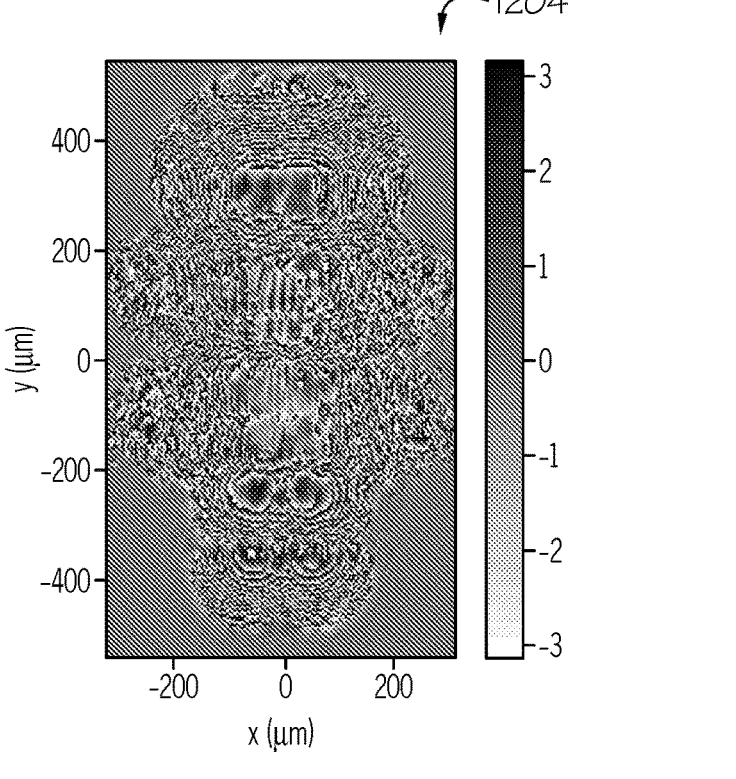
Figure 9C:
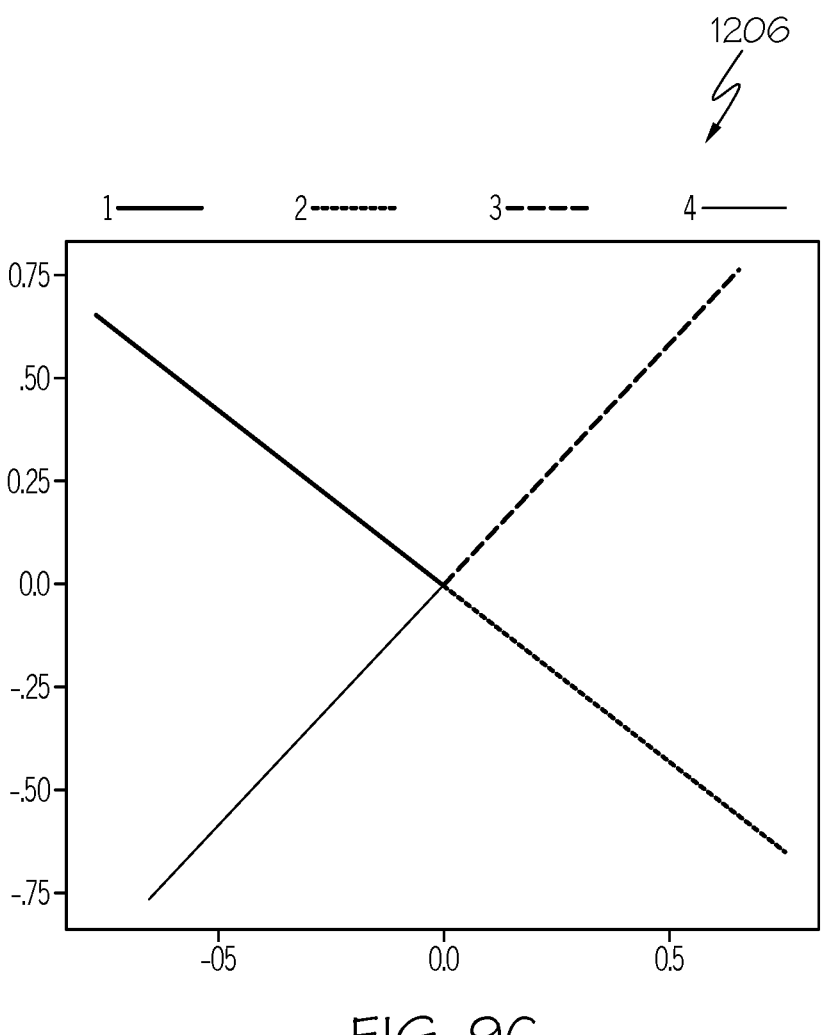
FIG. 9C depicts a plot of phases between output optical signals of the example optical device having the combined phase profile depicted in FIG. 9B, according to one or more embodiments described herein.

FIGS. 9A-9C schematically depict various aspects of an optical signal manipulation device configured to operate 90-degree optical hybrid. The optical signal manipulation device described with respect to FIGS. 9A-9C may have a structure similar to the optical device 403 described herein with respect to FIG. 4C. The transmissive substrate 405 has a thickness of 200 μm. Both the input and output fibers 450 and 455 comprise a 2×2 multi-core fiber with a core-to-core spacing of 45 μm.

FIG. 9A1 depicts an input aperture 1200 and FIG. 9A2 depicts an output aperture 1202 of the optical signal manipulation device. The input aperture 1200 (e.g., an aperture mask) comprises a pair of openings shaped in a manner that correspond to two the cores of the input fiber 450. The output aperture 1202 comprises a plurality of openings shaped in a manner that correspond to the cores of the output fiber 455.

FIG. 9B depicts a combined phase profile 1204 for the plurality of metasurfaces 410 of the optical signal manipulation device. In embodiments, the 90 degree optical hybrid converts two input modes A and B propagating through cores of the input fiber 450 into four different outputs A+B, A–B, A+jB, and A–jB. The combined phase profile 1204 (e.g., determined by the structural arrangement of the plurality of nanostructures associated with the plurality of metasurfaces 410) is configured to redirect and combine different portions of the two input modes A+B with different phasing so as to achieve the desired outputs at the output aperture 1202 for coupling with the output fiber 455. The plurality of metasurfaces 410 of the optical hybrid may comprise greater than or equal to four metasurfaces to generate the combined phase profile 1204.

Table 7 provides simulation results of the insertion loss between each input and output port pair (e.g., between each different pair of cores of the input fiber 450 and output fiber 455). Given that zero loss corresponds to 6.02 (representing a quarter of each of the input signals being equally split into each of the four different channels of the output fiber 455), the additional loss caused by the plurality of metasurfaces appears to be maximally 0.4 dB.

TABLE 7

| MCF$_1$ | MCF$_2$ | | | |
|---|---|---|---|---|
| | 1 | 2 | 3 | 4 |
| 1 | 6.18 | 6.102 | 6.438 | 6.188 |
| 2 | 6.114 | 6.32 | 6.071 | 6.382 |

Additionally, to operate effectively as a 90-degree optical hybrid, the phase differences between signals in the channels of the output fiber 455 should be 90 degrees. That is, the fourth output channel should have a phase difference of 90 degrees with the first output channel, while the third output channel should have a phase difference of 90 degrees with the second output channel. FIG. 9C depicts a plot 1206 depicting simulated relative phase of the input signals in the first, second, third, and fourth output channels respectively. The first output channel is predicted to have a phase of 139.90 degrees, the second output channel is predicted to have a phase of 319.53 degrees, the third output channel is predicted to have a phase of 48.90 degrees, and the fourth output channel is predicted to have a phase of 229.716 degrees. As such, the phase differences between the desired channels is approximately 90 degrees, indicating successful operation as a 90-degree optical hybrid. The phase differences may depend on the operating wavelength. In embodiments, the optical signal manipulation devices described herein achieve 5 degree phase-difference accuracy within a 20 nm bandwidth. That is, the optical signal manipulation devices described herein may provide the phase differences described above that are greater than or equal to 85 degrees and less than or equal to 90 degrees, while operating within a 20 nm bandwidth window (e.g., greater than or equal 1540 nm and less than or equal to 1560 nm).

In view of the foregoing description, it should be understood that optical signal manipulation devices comprising a plurality of metasurfaces may serve a number of different functions in an optical fiber transmission system depending on a combined phase profile of the plurality of metasurfaces. The combined phase profile of the plurality of metasurfaces may beneficially be structured by spatially varying geometric parameters of pluralities of nanostructures in each of the plurality of metasurfaces to achieve an arbitrary phase profile for the particular function being served. The metasurfaces may be structured based on numbers and arrangements of optical signals interacting with the optical signal manipulation device as well as the operations (e.g., splitting, combining, rearranging) to be performed on the optical signals. The configurability of the combined phase profiles facilitates accommodation of a plurality of different arrangement of fibers (e.g., single core fiber arrays, multi-core fibers, fiber cables, or any combination thereof). As described herein, the metasurface-based optical signal manipulation devices described herein may be relatively compact (e.g., having overall thicknesses of less than or equal to 1 mm or less than or equal to 500 μm or less than or equal to 300 μm or less than or equal to 200 μm) as compared to existing devices performing similar functions. Moreover, the optical signal manipulation devices described herein may be monolithically formed using nanofabrication techniques, providing precise control over the constructed phase profiles and operation of the device.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is depicted in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

What is claimed is:

1. An apparatus comprising:

a fiber input, the fiber input comprising a plurality of input fiber cores, the plurality of input fiber cores receiving a plurality of input optical signals;

an optical signal manipulation device, the optical signal manipulation device comprising:

an input aperture held in spaced relation to the fiber input to receive the plurality of input optical signals in a first spatial arrangement;

a plurality of metasurfaces, each of the plurality of metasurfaces comprising a plurality of nanostructures separated from one another by less than a wavelength of the plurality of input optical signals; and an output aperture, wherein the plurality of metasurfaces manipulate phase profiles of the plurality of input optical signals to generate a plurality of output optical signals, wherein the plurality of output optical signals have a second spatial arrangement at the output aperture that differs from the first spatial arrangement; and a fiber output comprising a plurality of output fiber cores, wherein the fiber output is held in spaced relation to the output aperture of the optical signal manipulation device such that the plurality of output fiber cores receive the plurality of output optical signals in the second spatial arrangement, wherein the optical signal manipulation device comprises one of a fiber mode shuffler, a fiber coupler, a power splitter, or a 90-degree optical hybrid, wherein at least two metasurfaces are disposed on opposite surfaces of a shared transmissive substrate, and wherein the at least two metasurfaces are configured to modify wavefront tilts of the plurality of input optical signals in a shared propagation direction toward the output aperture of the optical signal manipulation device.

2. The apparatus of claim 1, wherein the fiber input comprises a first multicore fiber and the plurality of input fiber cores are disposed in a common cladding of the first multicore fiber.

3. The apparatus of claim 2, wherein the plurality of input fiber cores are disposed in the common cladding in an arrangement that corresponds to the first spatial arrangement of the plurality of input optical signals.

4. The apparatus of claim 3, wherein the fiber output comprises a second multicore fiber and the plurality of output fiber cores are disposed in a common cladding of the second multicore fiber in an arrangement that corresponds to the second spatial arrangement of the plurality of output optical signals.

5. The apparatus of claim 1, wherein the fiber input comprises a first single core fiber array and the fiber output comprises a second single core fiber array.

6. The apparatus of claim 5, wherein the first and second single core fiber arrays comprise the same core spacing.

7. The apparatus of claim 1, wherein the plurality of metasurfaces comprises a first metasurface and a second metasurface, the first metasurface comprising a first plurality of nanostructures arranged in a pattern based on the first spatial arrangement such that the first plurality of nanostructures modify wavefront tilts of the plurality of input optical signals between the first metasurface and the second metasurface.

8. The apparatus of claim 7, wherein the second metasurface re-directs the plurality of output optical signals towards the plurality of output fiber cores in the second spatial arrangement.

* * * * *